(12) United States Patent  
Tsuda et al.

(10) Patent No.: US 6,597,540 B2  
(45) Date of Patent: Jul. 22, 2003

(54) HEAD ARM HAVING THROUGH HOLE FOR MAKING HEAD ARM LIGHTWEIGHT, HEAD MOVING MECHANISM AND DISK UNIT HAVING THE HEAD ARM

(75) Inventors: Naozumi Tsuda, Kawasaki (JP); Tsugito Maruyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/198,230

(22) Filed: Jul. 18, 2002

(65) Prior Publication Data

US 2002/0186511 A1 Dec. 12, 2002

Related U.S. Application Data

(62) Division of application No. 09/631,915, filed on Aug. 3, 2000.

(30) Foreign Application Priority Data

Oct. 15, 1999 (JP) .......................................... 11-293716

(51) Int. Cl.[7] .................................................. G11B 5/55

(52) U.S. Cl. ..................................... 360/265.9; 360/266

(58) Field of Search ............................... 360/265.9, 266

(56) References Cited

U.S. PATENT DOCUMENTS

| | | | | |
|---|---|---|---|---|
| 4,352,133 A | * | 9/1982 | Hager | 360/266 |
| 5,801,905 A | | 9/1998 | Schirle et al. | 360/104 |
| 5,854,725 A | * | 12/1998 | Lee | 360/266 |
| 5,864,444 A | * | 1/1999 | Baker | 360/266 |
| 5,999,372 A | * | 12/1999 | Peterson | 360/266 |

* cited by examiner

*Primary Examiner*—A. J. Heinz  
(74) *Attorney, Agent, or Firm*—Greer, Burns & Crain, Ltd.

(57) ABSTRACT

A head arm includes a main body, partially located with a first area above a recordable medium. The main body includes a first surface opposite to the recordable medium and a second surface opposite to the first surface. A hole extends through the main body between the first and second surfaces. The main body also has a first connector portion connectible to a driving portion; and a second connector portion connectible to a head. The through hole is formed on only one side with respect to a line that halves the first area between said first and second connector portions.

12 Claims, 27 Drawing Sheets

HEAD ARM HAVING THROUGH HOLE FOR MAKING HEAD ARM LIGHTWEIGHT, HEAD MOVING MECHANISM AND DISK UNIT HAVING THE HEAD ARM

This is a divisional of application Ser. No. 09/631,915, filed Aug. 3, 2000.

BACKGROUND OF THE INVENTION

The present invention relates generally to head moving mechanisms (or head actuators) for a recordable medium, and more particularly to a head arm that supports and moves the head. The recordable medium typically is a disk in form, but broadly covers various types taking the form of a card, a sheet and others. The head may move in any direction, straight, swingingly, up and down, etc. The head arm as one exemplified embodiment of the present invention is suitable for those disk units which broadly include a magnetic disk unit, optical disk unit, magneto-optic disk unit, DVD unit, CD audio player, a variety of game machines using a dedicated disk.

There has been a demand for quick head positioning onto a specified track in magnetic or other disk units. The head moving mechanism typically includes a head, a head arm, and a suspension that connects the head and arm. Reduced moment of inertia of the head moving mechanism is effective for the quick head positioning. A pierced head arm has been thus proposed to reduce the weight of the head arm.

As shown in FIG. 32, for example, a conventional head moving mechanism 10 includes a head arm 20, a suspension 30, and a head 40. Hereupon, FIG. 32 is an illustrative schematic plan view of the conventional head moving mechanism 10. The head arm 20 is connected to the suspension 30 at its top 22 and to a rotation shaft 50 at its base 24. The head arm 20 also includes a through hole 26 that perforates from its top surface through its bottom surface for weight reduction. One or two through holes 26 are made as large as possible to the extent that the head arm 20 may maintain specified rigidity. The head arm 20 crosses a disk at its upper side of the dotted line in FIG. 32.

However, the conventional disk unit has a disadvantage in that it cannot quickly position the head at a target position due to disturbance (vibration, etc.) by airflow between disks. The airflow is produced by rotations of the disks as indicated by a solid arrow A in FIG. 32, and has a deleterious effect especially in a hermetic space. In particular, where a head arm is located between the disks and support a pair of heads that read data on the upper and lower disks would narrow the hermetic space, and thus increase the effect of the airflow.

As shown by an arrow in FIG. 33, the airflow is sucked into the hole of the head arm, swirls, and causes vibration at frequencies commensurate with the current. Hereupon, FIG. 33 is a sectional view taken along a line B—B of the head moving mechanism 10 shown in FIG. 32 when placed between a pair of upper and lower disks 2. A magnetic disk unit in the past rotated the disks at a relatively low rotary speed, i.e., a few thousand rpm, and the air flew at low velocity. Therefore the disturbance by the air had little effect, and no consideration has been given to a shape of the head arm in view of the airflow.

However, the trend toward accelerated disk speed in recent years has brought about increased disk rotating speed, which has boosted the velocity of the airflow around the head arm. Consequently, recent years have seen a nonnegligible effect of the disturbance by airflow on the disk unit. Specifically, an arm has a sectionally rectangular shape and includes a part that orthogonally crosses the airflow, thus suffering for the high air drag. In addition, the airflow greatly deflects out of top and bottom ends of surfaces orthogonal to the airflow, and vibrates the arm. Moreover, the disturbed airflow in the presence of the arm disadvantageously affects the disks and induces vibrations of the disks. As the velocity of the air increases, the disturbance by the air pressure has induced high-frequency disturbance extending up to a few kHz in addition to low-frequency disturbance. Since the according density of the disk increases year after year, it is necessary not only to improve a control performance of the head arm but also to reduce the disturbance by airflow, in order to improve a positioning performance.

BRIEF SUMMARY OF THE INVENTION

Therefore, it is an exemplified general object of the present invention to provide a novel and useful head arm, head moving mechanism, disk unit, and method of manufacturing the head arm, in which the above disadvantages are eliminated.

Another exemplified and more specific object of the present invention is to provide a head arm, head moving mechanism, disk unit, and method of manufacturing the head arm that permits quick positioning of the head.

In order to achieve the above objects, the head arm as one exemplified embodiment of the present invention comprises a main body, partially located above a recordable medium, that the main body includes a first surface opposite to the recordable medium and a second surface opposite to the first surface, the first and second surfaces having no perforation above the recordable medium as viewed from the recordable medium, a first connector portion connected to the main body, and connectible to a driving portion, and a second connector portion connected to the main body, and connectible to a head. This head arm allows no airflow to pass through the head arm, and thus undergoes little influence of disturbance such as vibration or the like.

The head arm as another exemplified embodiment of the present invention comprises a main body, partially located with a first area above a recordable medium, that the main body includes a first surface opposite to the recordable medium and a second surface opposite to the first surface, the first and second surfaces having a through hole, a first connector portion connected to the main body and connectible to a driving portion, and a second connector portion connected to the main body, and connectible to a head, wherein the through hole is formed on only one side with respect to a line that halves the first area. This head arm becomes lightweight because of the through hole, and also reduces disturbance by airflow, by the restricted position of the through hole. Particularly, the head arm having a plurality of through holes may effectively prevent the disturbance.

The head arm as still another exemplified embodiment of the present invention comprises a main body, partially located above a recordable medium, that the main body includes a first surface opposite to the recordable medium and a second surface opposite to the first surface, the first and second surfaces having a plurality of through holes formed like a mesh, a first connector portion connected to the main body, and connectible to a driving portion, and a second connector portion connected to the main body, and connectible to a head. This head arm having meshed through holes would reduce the magnitude of the airflow as passing through them.

The head arm as still another exemplified embodiment of the present invention comprises a main body, partially located above a recordable medium, wherein the main body includes a buffer mechanism, connected to at least one of a third surface opposite to an airflow generated above the recordable medium and a fourth surface opposite to the third surface for mitigating disturbance of the airflow, a first connector portion connected to the main body, and connectible to a driving portion, and a second connector portion connected to the main body, and connectible to a head. This head arm uses the buffer mechanism (e.g., a step, chamfered portion, projection portion formed on at least one of the third and fourth surfaces, and/or through hole that perforates the third and fourth surfaces) to restrict disturbance by the airflow.

The head moving mechanism as one exemplified embodiment of the present invention comprises any one of the above head arms, and a head connected to the second connector portion of the head arm. This head moving mechanism may achieve the same operation as the above-described head arms.

The disk unit as one exemplified embodiment of the present invention comprises any one of the above head arms, wherein the recordable medium is a disk, a head connected to the second connector portion of the head arm, a driving portion connected to the first connector portion of the head arm, a signal processor portion that handles a signal communicated between the head and the disk, a rotor portion that rotates the disk, and a controller portion that controls movements of the head, operations of the signal processor portion and rotor portion. This disk unit may achieve the same operation as the above-described head arms.

The method of manufacturing a head arm comprises the steps of forming a body base material having a desired thickness, providing a through hole for making the body base material lightweight, and sealing at least a part of the through hole. This manufacturing method of a head arm makes it possible to provide a lightweight head arm while preventing disturbance by airflow.

Other objects and further features of the present invention will become readily apparent from the following description of the embodiments with reference to accompanying drawings.

DETAILED DESCRIPTION OF INVENTION

Figure 1:
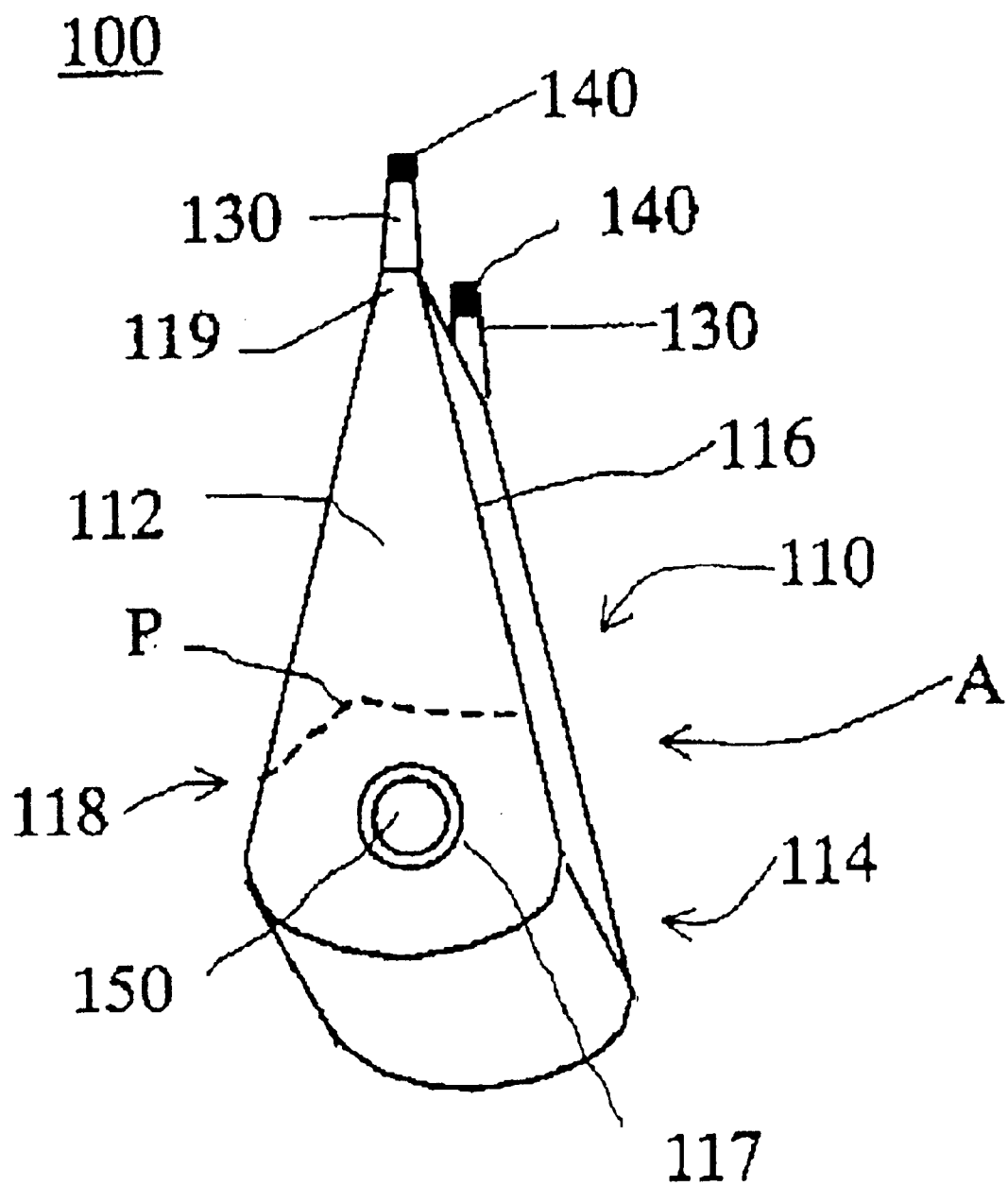
FIG. 1 is a schematic perspective view of a head moving mechanism as one embodiment of the present invention.

A description will now be given of a head moving mechanism as one exemplified embodiment of the present invention, with reference to the drawings. In each figure, those elements which are the same are designated by the same reference numerals, and a duplicated description thereof will be omitted. The same reference numerals with an alphabetic letter attached thereto generally designate a variation of the elements identified by the reference numeral without an alphabetic letter, and reference numerals without an alphabetic letter, unless otherwise specified, comprehensively designate the element identified by the reference numerals with an alphabetic letter. Hereupon, FIG. 1 is a schematic perspective view of the head moving mechanism 100 as one exemplified embodiment of the present invention.

Referring to FIG. 1, the inventive head moving mechanism 100 includes a head arm 110, a suspension 130, and a head 140. The head arm 110 includes a top surface 112, a bottom surface 114, a right side surface 116, and a left side surface 118. The head arm 110 is connected to a driving shaft 150 at its base 117 and to a suspension 130 at its top 119. The head arm 110 may swing about the driving shaft 150, and an upper side of a dotted line P is located above a disk (not shown). Suppose that the head arm 110 receives from an arrow direction A an airflow generated on a moving disk in the present embodiment. Thus the right side surface 116 faces a windward side of the head arm 110.

Figure 33:
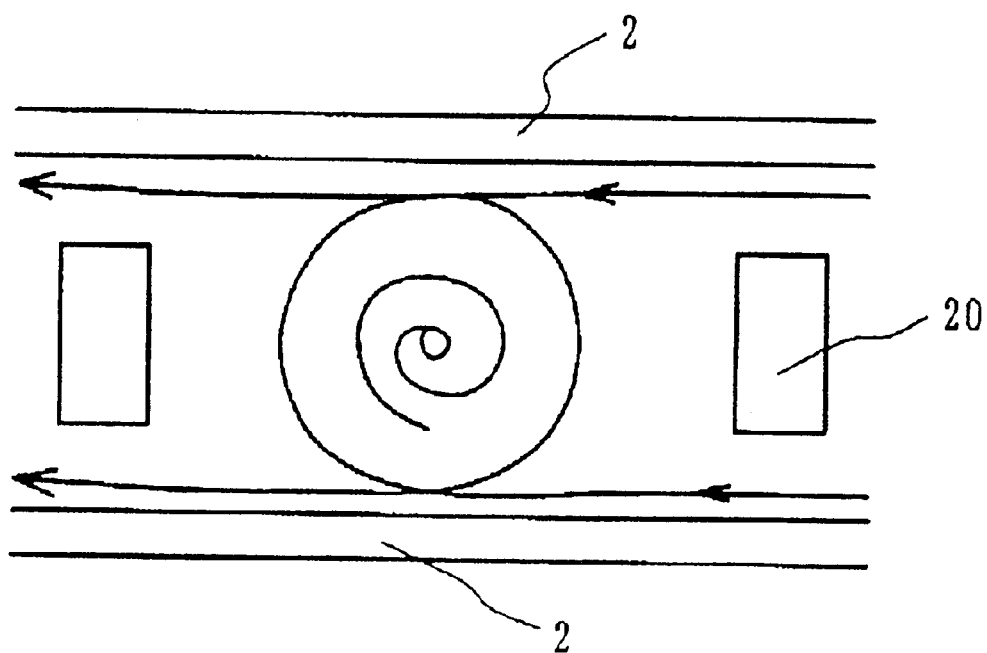
FIG. 33 is a sectional view taken along a line B—B of the head moving mechanism shown in FIG. 32 when placed between a pair of upper and lower disks.

The head arm 110 supports a pair of suspensions and heads, moves them above a disk (not shown) about the driving shaft 150, and places them between a pair of disks 2 as will be described later. The top and bottom surfaces 112, 114 have a substantially sectorial shape, and the right side and left side surfaces 116, 118 have a substantially rectangular shape. These shapes are for exemplary purposes only, and the head arm 110 may have any other shape. A manufacturing method of the head arm 110 will be described later. The head arm, though configured to swing in the present embodiment, may have any other moving structure such as moving straight, up and down The head arm 110 in the present embodiment has no through hole at an upper side of a dotted line P (i.e., at a side of the head 140 or top 119) on the top and/or bottom surfaces 112, 114. This configuration can consequently prevent disturbance (or vibration) by airflow as passing through the through hole as shown in FIG. 33. 'No through hole', to be exact, means that no through hole can be seen when viewed from outside the head arm 110. Accordingly, the top and/or bottom surfaces 112, 114 have no through hole at an upper side of the dotted line P if the top and/or bottom surfaces 112, 114 are entirely flat, partly recessed, provided with a through hole sealed at least at its one side, or the like. The head arm 110 preferably has reduced weight to produce less moment of inertia for quick head positioning. Thus, the head arm 110 preferably has its part removed to save weight. Therefore, from the viewpoint of reduction of its weight, the top and/or bottom surfaces 112, 114 of the head arm 110 preferably includes a recessed portion at its one or both holes, or a sealed through hole rather than being entirely flat in an upper side area of the dotted line P. The 'recessed portion' is intended to comprehensively include a groove, an indentation, and any concave portions that may be formed on one surface but not perforate through the other surface, no matter what they are called.

Figure 2:
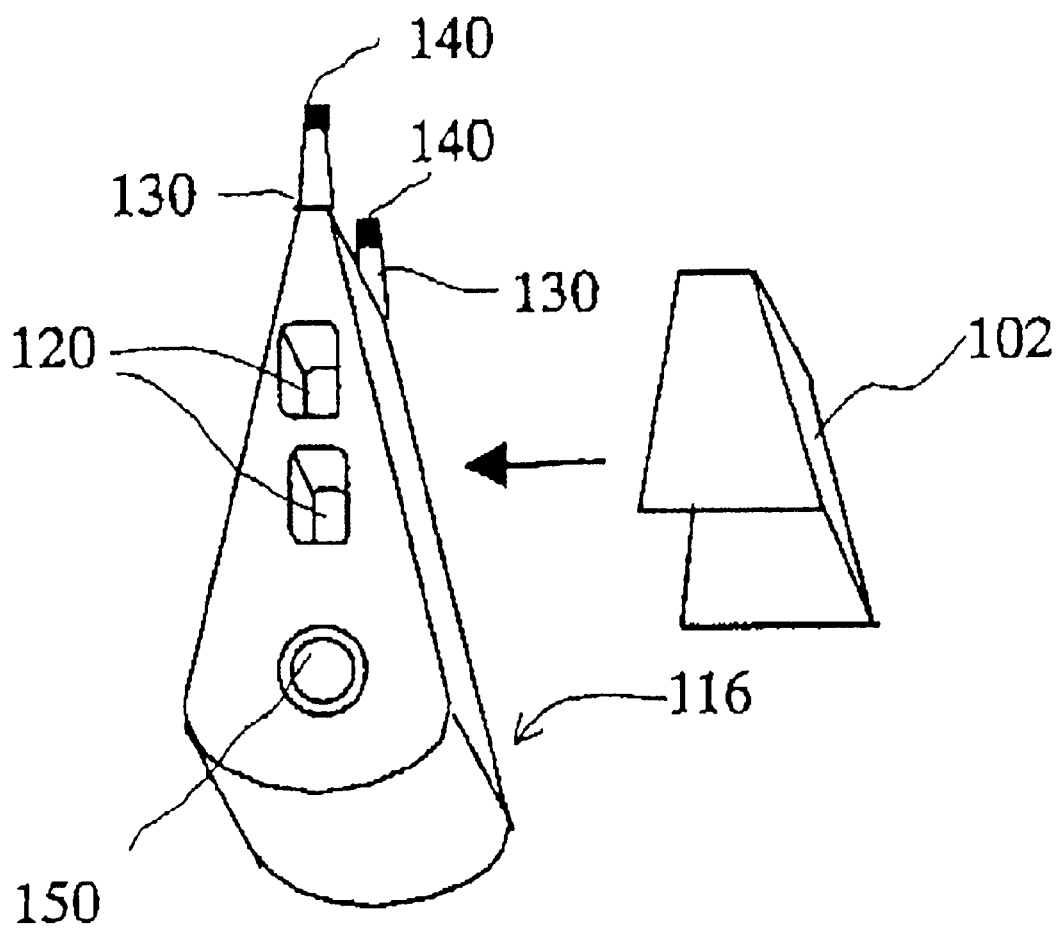
FIG. 2 is a schematic perspective view for explaining a formation of the head moving mechanism shown in FIG. 1 by sealing a through hole provided in the head arm with a sealing member.
Figure 3:
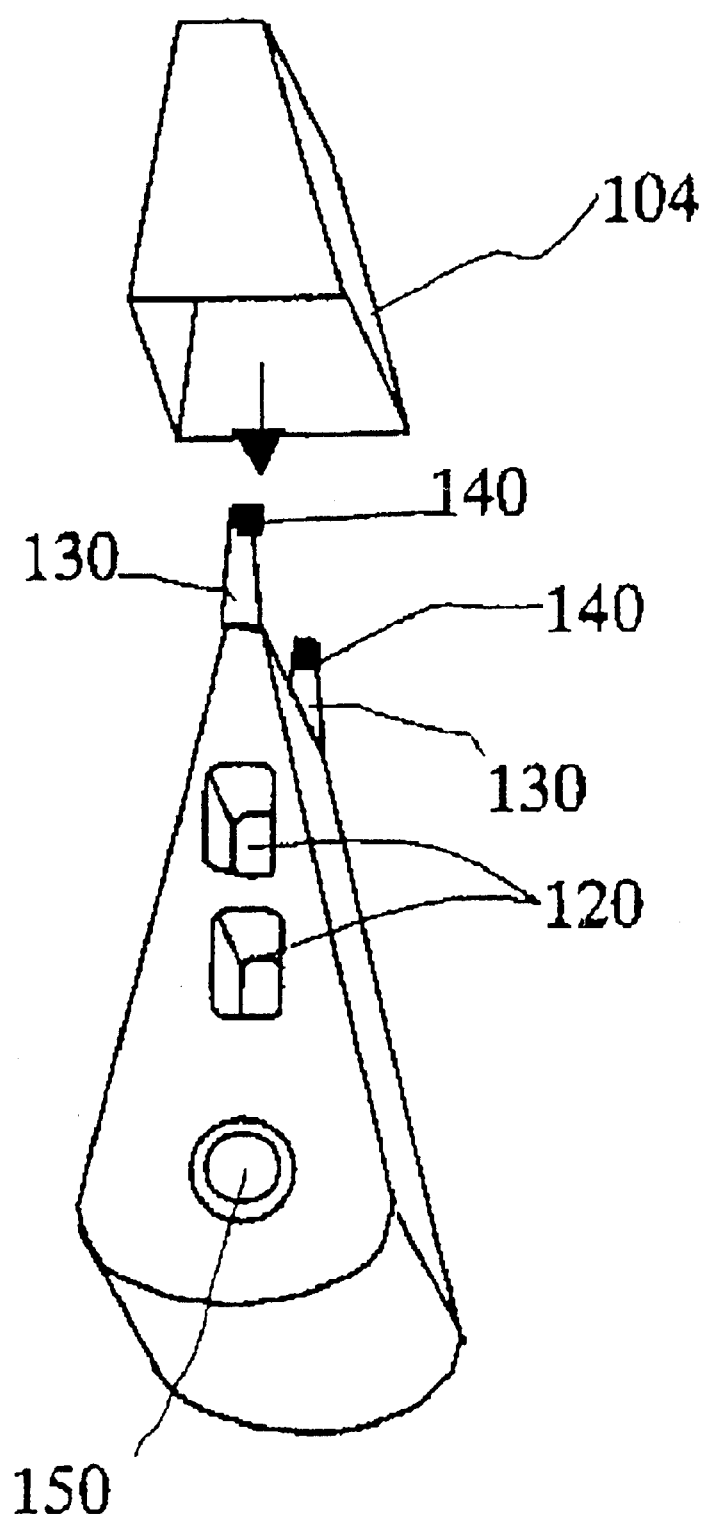
FIG. 3 is a schematic perspective view for explaining another formation of the head moving mechanism shown in FIG. 1 by sealing a through hole provided in the head arm with a sealing member other than that shown in FIG. 2.

FIGS. 2 and 3 show the head arm 110 including a sealed though hole 120 between the top and bottom surfaces 112, 114. FIG. 2 is a schematic perspective view for explaining a formation of the head moving mechanism 100 shown in FIG. 1 by sealing the through hole 120 provided in the head arm 110 with a sealing member 102. FIG. 3 is a schematic perspective view for explaining another formation of the head moving mechanism 100 shown in FIG. 1 by sealing the through hole 120 provided in the head arm 110 with a sealing member 104.

The sealing member 102 is loaded onto the head arm 110 from the right side surface 116 of the head arm 110, while the sealing member 104 is loaded onto the head arm 110 from the head side of the head arm 110. The sealing member 102 is U-shaped in section, while the sealing member 104 is rectangle-shaped in section. The sealing members 102 and 104 are made of tape (e.g., Kapton tape) or metal (e.g., aluminum, and stainless steel), or the like. Needless to say, the sealing member is not required to be three-dimensional, but may be a tape that seals the through hole 120 at the top and/or bottom surfaces 112, 114 of the head arm 110. From the viewpoint of the prevention of disturbance, the head arm is preferably entirely flat in the upper side area of the dotted line P on the top and bottom surfaces 112, 114. Thus, the through hole 120 is preferably sealed at the top and/or bottom surfaces 112, 114.

Figure 5:
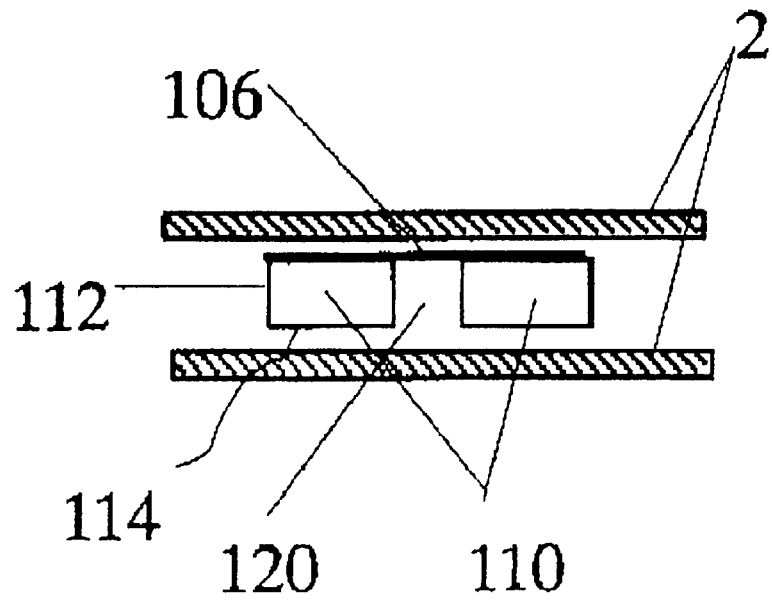
FIG. 5 is a sectional view of the head arm shown in FIG. 1, in which the through hole is sealed at its top.

The number and location of the through hole 120 are illustrative in FIGS. 2 and 3. The sealing members 102 and 104 seal at least one through hole 120 among a plurality of through holes 120. FIG. 5 shows a sectional view of the head arm with its top surface 112 sealed over its through hole 120 by a sealing member 106 made of tape or the like. However, from the viewpoint of the prevention of disturbance, the sealing members 102 and 104 preferably seal all the through holes 120. Moreover, the sealing member may be made integral with the head arm 110, for example, as an openable shutter that is attached to the head arm 110. The sealing member may not be limited to seal a thorough hole provided in the head arm 110, but may be used to seal a recess. Further, the sealing member, in the broadest sense of the term, should only reduce a sectional area of the through hole 120 to reduce the airflow, and thus may include a hole having a smaller opening area than the cross-sectional area of the through hole 120.

Figure 4:
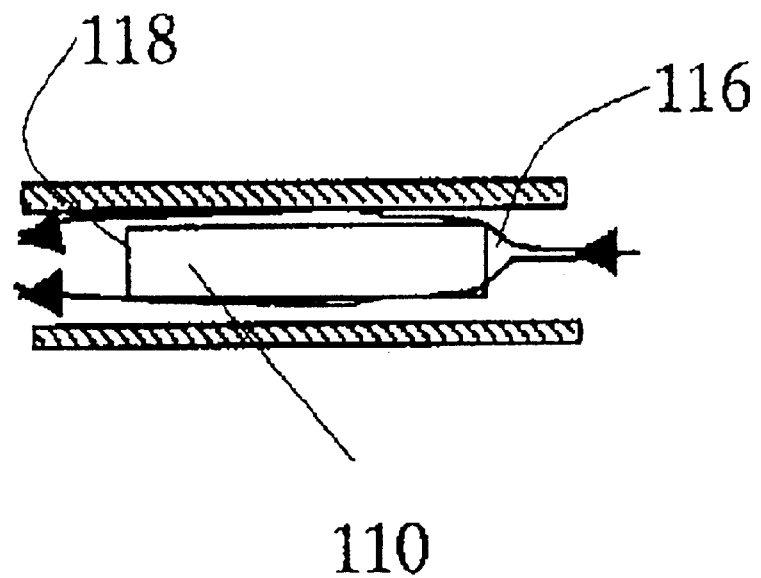
FIG. 4 is a sectional view for illustrating a relationship between the airflow and the head arm shown in FIG. 1 having flat top and bottom surfaces.

FIG. 4 is a sectional view for illustrating a relationship between the airflow and the head arm 110 having flat top and bottom surfaces 112, 114 in the upper side area of the dotted line P. It may be understood as indicated in the drawing that the airflow does not pass through the inside of the head arm 110 so that the head arm 110 may be unsusceptible to vibration or other types of disturbance.

Figure 6:
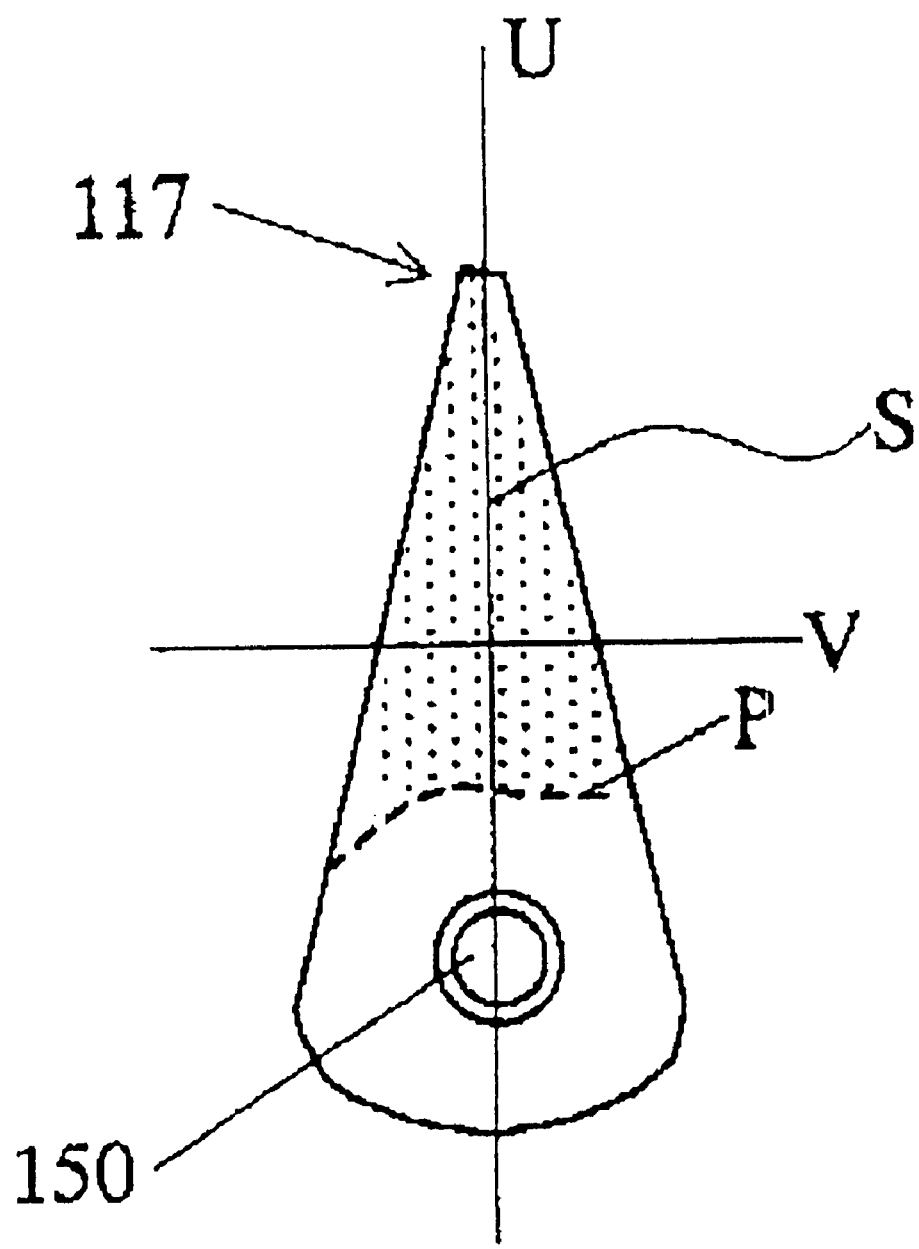
FIG. 6 is a schematic plan view of the head arm shown in FIG. 1 for explaining its area S that may cover the top of a disk and a line V that halves the area S.
Figure 7:
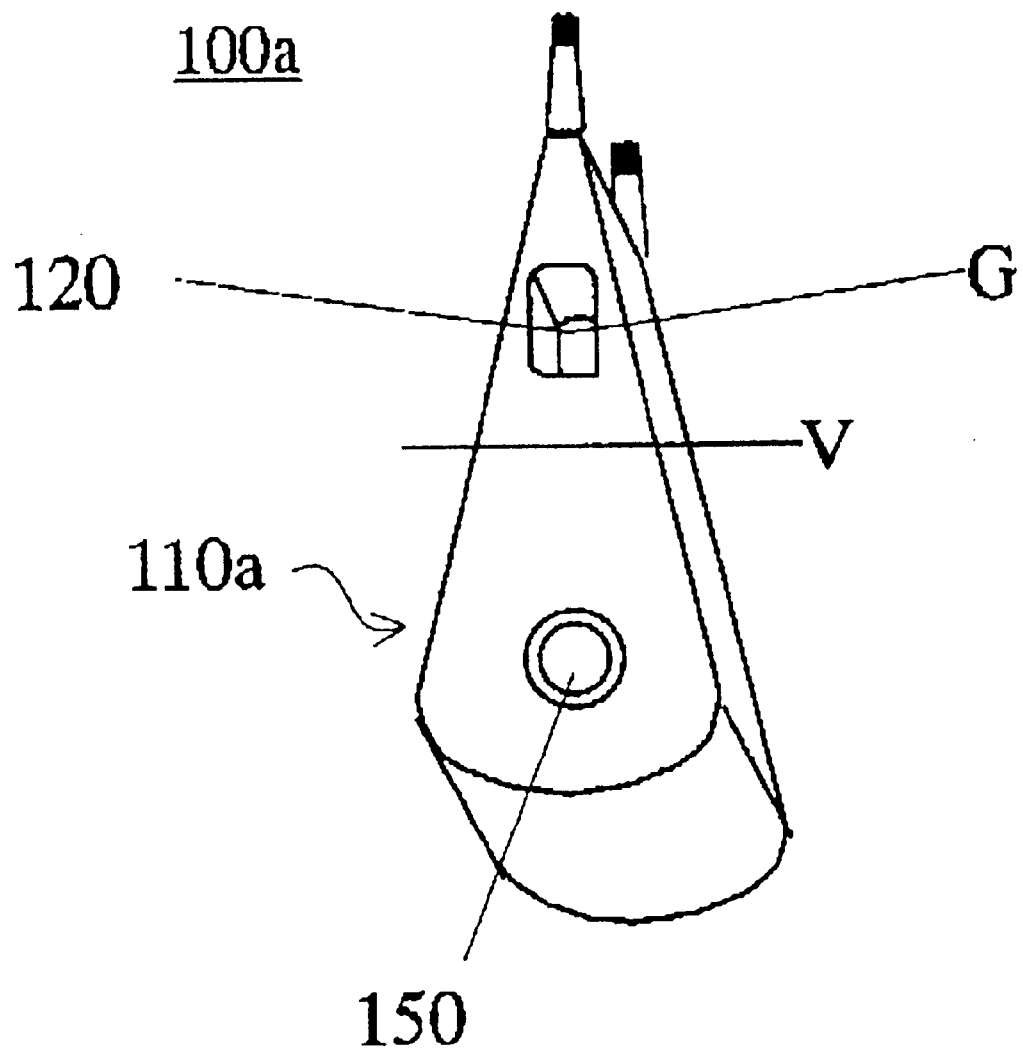
FIG. 7 is a schematic perspective view of a head moving mechanism that includes a through hole at an upper side of the area dividing line V.
Figure 8:
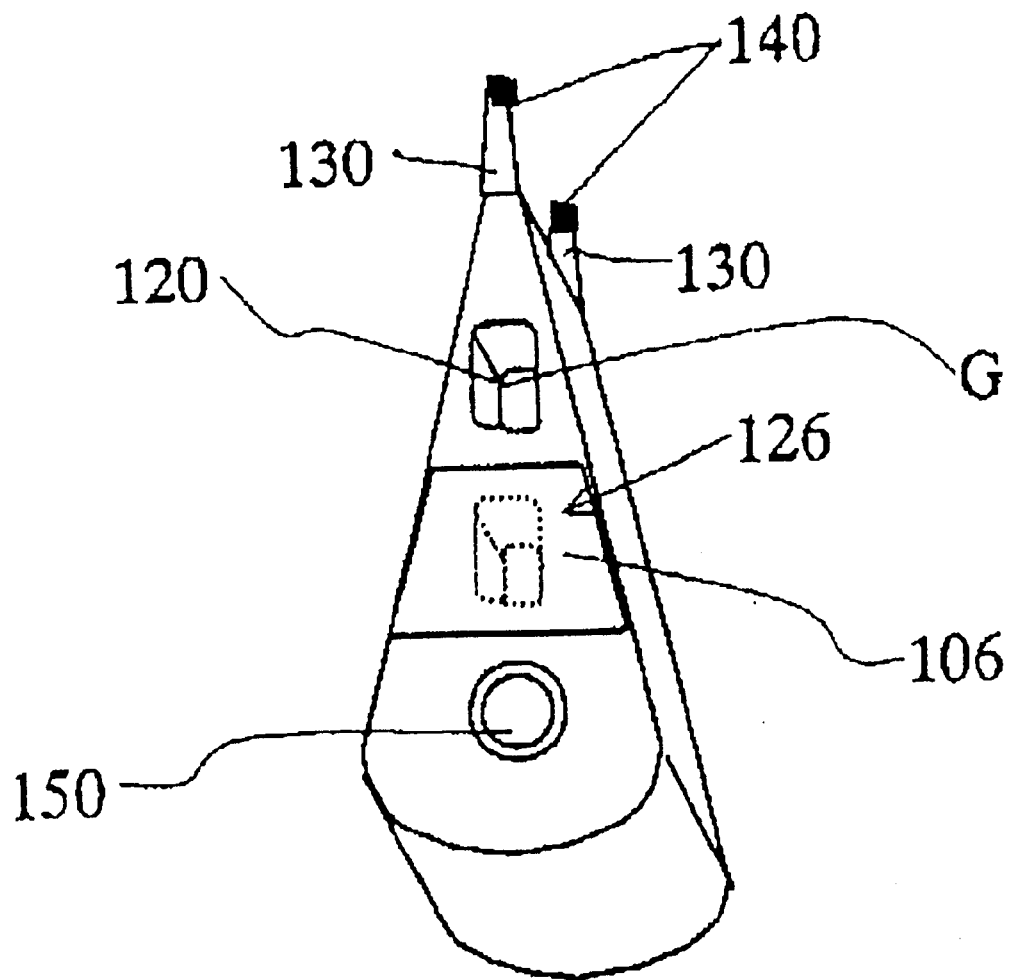
FIG. 8 is a schematic perspective view for explaining a method of substantially realizing the head moving mechanism shown in FIG. 7.
Figure 9:
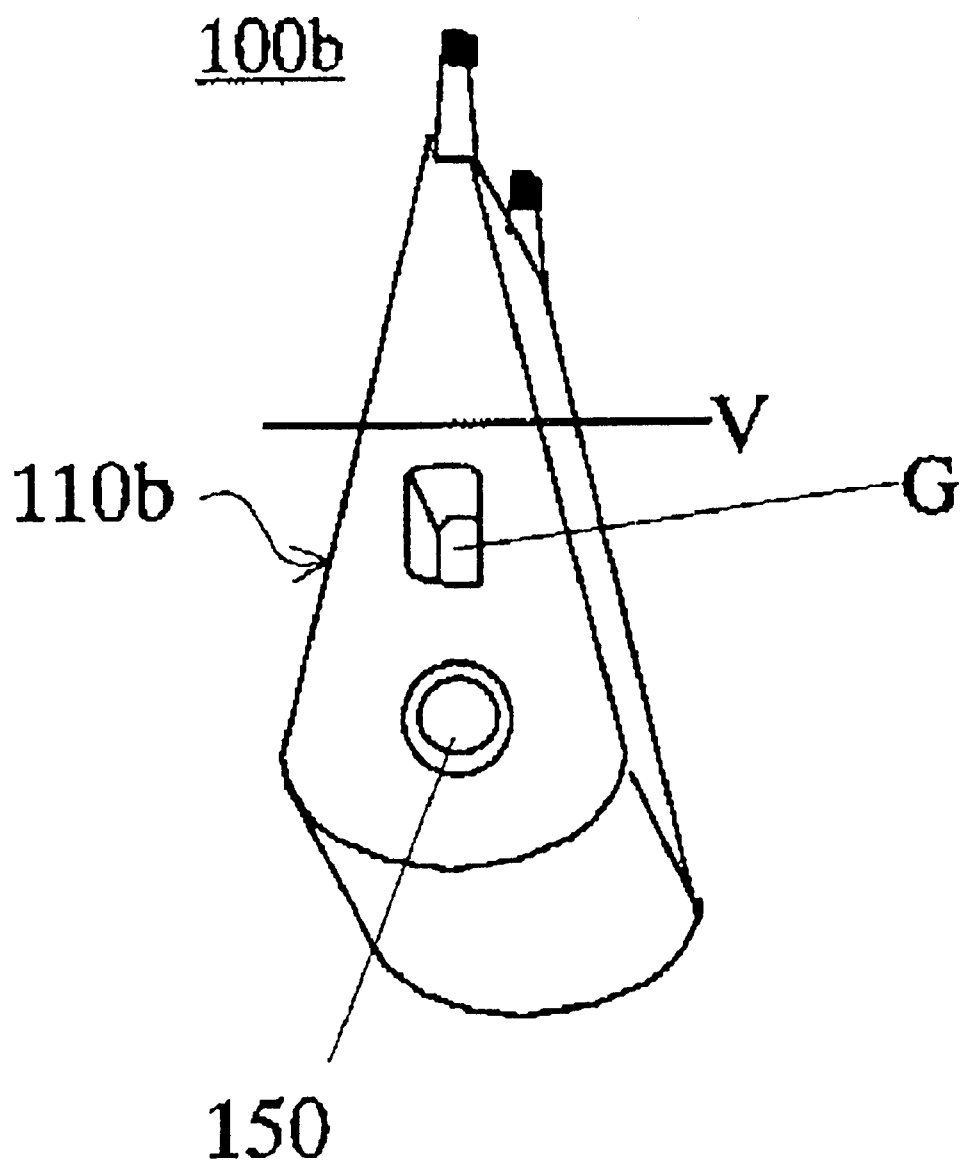
FIG. 9 is a schematic perspective view of a head moving mechanism that includes a through hole at a lower side of the area dividing line V.

Referring next to FIGS. 6 through 9, a description will be given of a variation of the head arm 110 shown in FIG. 1. FIG. 6 is a schematic plan view of the head arm 110 shown in FIG. 1 for explaining its area S that may cover the top of a disk and a line V that halves the area S. FIG. 7 is a schematic perspective view of a head moving mechanism 100a that includes a through hole 120 (or at least the barycenter G thereof) at an upper side (i.e., at a side of the head 140 or top 119) with respect to the area dividing line V. FIG. 8 is a schematic perspective view for explaining a method of substantially realizing a head moving mechanism 100a shown in FIG. 7. FIG. 9 is a schematic perspective view of a head moving mechanism 100b that includes a through hole 120 (or at least the barycenter G thereof) at a lower side (i.e., at a side of the driving shaft 150 or base 117) with respect to the area dividing line V.

The head arms 110a and 110b of these embodiments feature no through hole 120 (or at least the barycenter G thereof) formed on the area dividing line V that will be described later. As a result, the head arms 110a and 110b can lessen the influence of the vibration by the airflow as greatly as possible, while meeting a requirement of weight reduction.

As described with reference to FIG. 1, the head arm 110 may not entirely cover the disk, but only its upper side area of the dotted line P may cover the disk as a result of rotation of the driving shaft 150. To be specific, the head arm 110 covers the disk in its hatched area S shown in FIG. 6. In FIG. 6, the line V indicates an area dividing line that halves the area S. The area dividing line V goes in a direction perpendicular to a straight line U that connects the center of the driving shaft 150 and the top 119, and divides the top surface 112 into two equal parts. The area dividing line V is also a tangent line of a circle (not shown) whose center is a rotary axis of the driving shaft 150.

The area dividing line V passes by a center of mass of a part of the head arm 110 that is over the disk. Accordingly, the head arm 110 where the through hole 120 (and its barycenter G) extends over the area dividing line V would get damaged more greatly by the influence by the airflow than that where the through hole 120 is formed in any other portion. That is the reason why the head arm of the present embodiment is configured to form the through hole 120 (or at least its barycenter G) at the only one side of the area dividing line V.

FIG. 7 shows the head arm 110a (head moving mechanism 100a) that includes the through hole 120 formed at an upper side (i.e., at a side of the head 140 or top 119) with respect to the area dividing line V. The head arm 110a shown in FIG. 7 includes one through hole 120. It may however be understood that the head arm 110 that would include two through holes, one of which is sealed by with a sealing member 106 as shown in FIG. 8 may have the same effect as the head arm 110a shown in FIG. 7. It goes without saying that the sealing member may take on any shape.

FIG. 9 shows the head arm 110b (head moving mechanism 100b) that includes the through hole 120 (or at least the barycenter G thereof) at a lower side (i.e., at a side of the driving shaft 150 or base 117) with respect to the area dividing line V. It may be understood that the head arm that includes a plurality of through holes 120, some of which are sealed, as in FIG. 8 may have the same effect as the head arm 110b.

Figure 10:
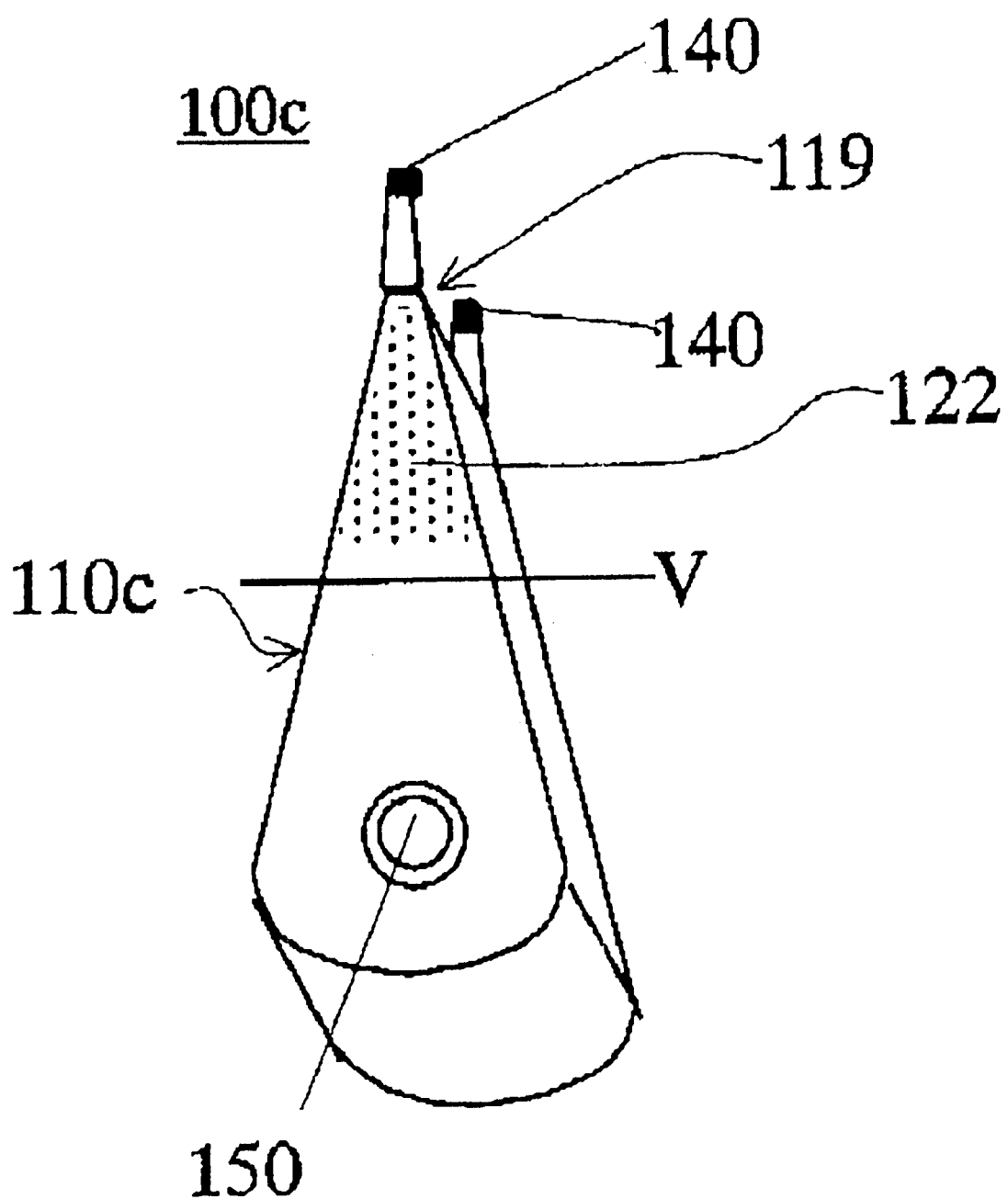
FIG. 10 is a schematic perspective view of a variation of the head moving mechanism shown in FIG. 7.
Figure 11:
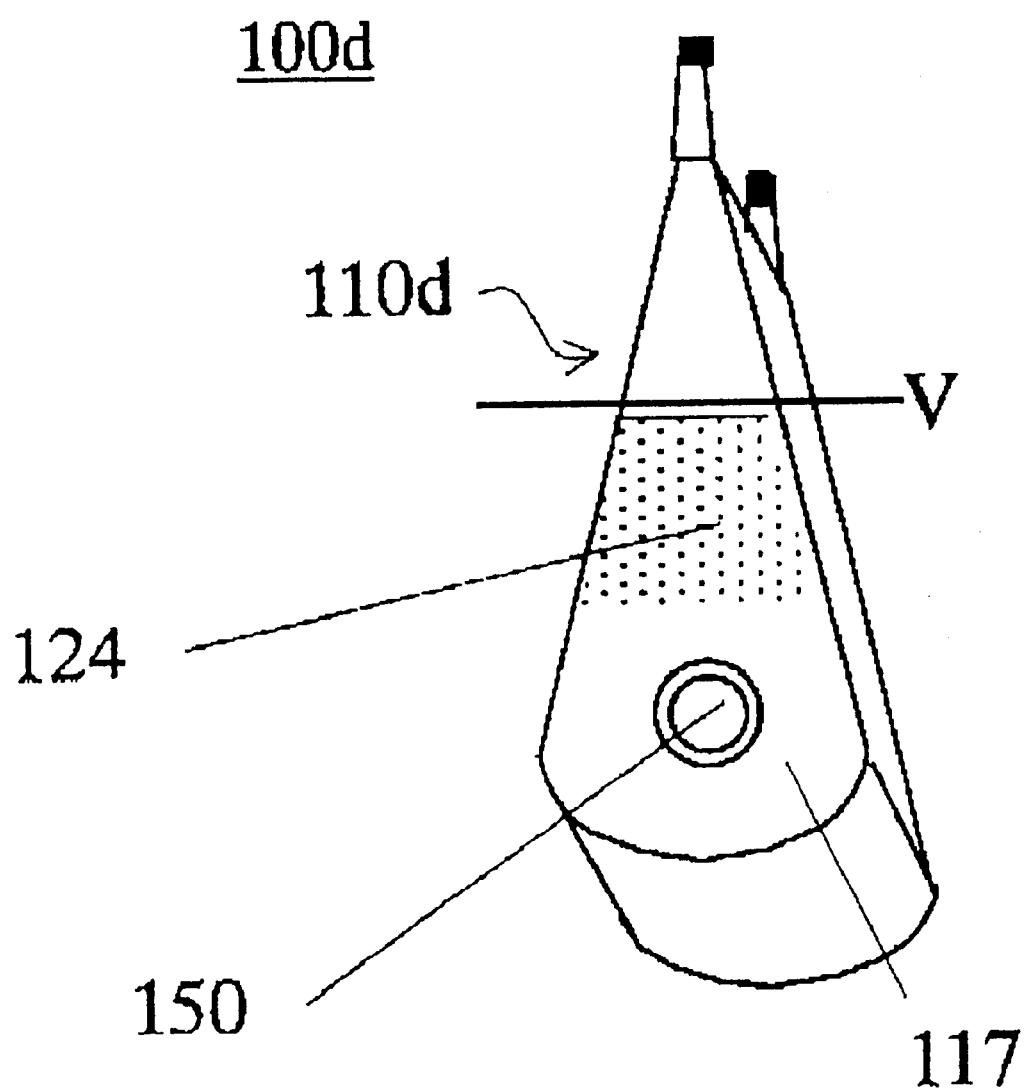
FIG. 11 is a schematic perspective view of a variation of the head moving mechanism shown in FIG. 9.
Figure 12:
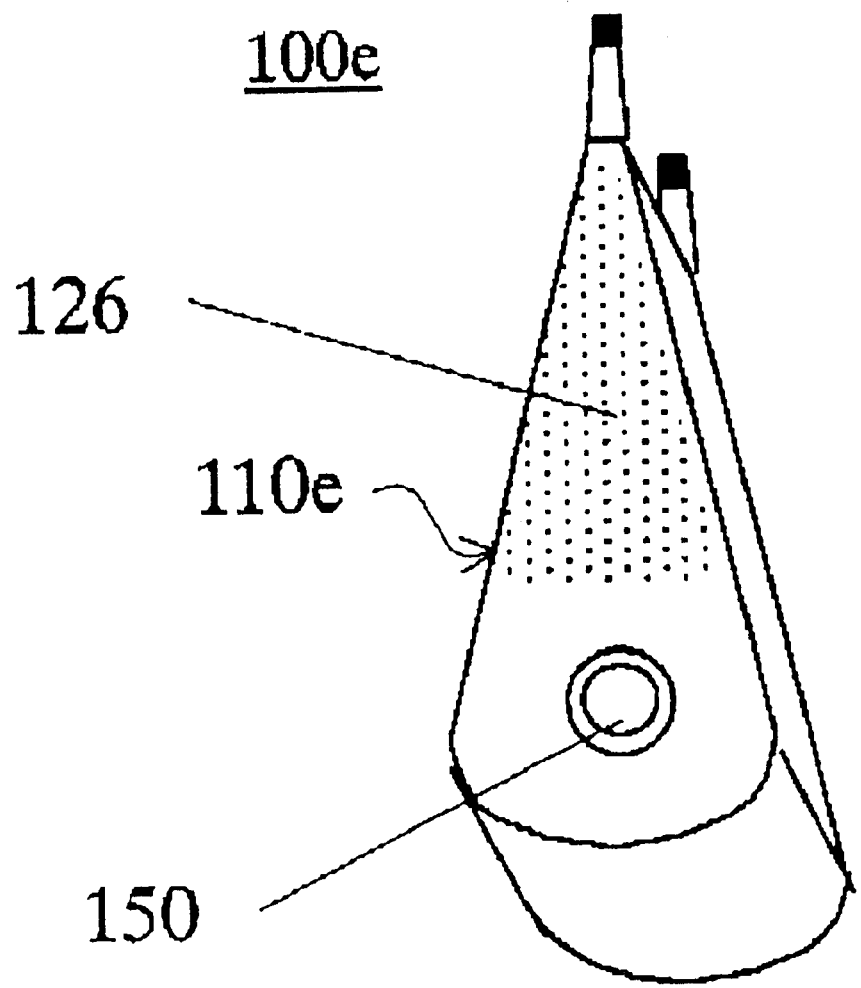
FIG. 12 is a schematic perspective view of a head moving mechanism that includes a mesh of through holes throughout an approximately entire area that covers the top of a disk.

When a plurality of the through holes 120 are provided, it is preferable to seal some of the through hole(s) 120 as in FIG. 8 or to locate all the through holes 120 only at one side of the area dividing line V. Moreover, the through hole 120 may be of any size as described above. Thus the through hole 120 may be replaced by a plurality of meshed holes each having a small sectional area. Referring now to FIGS. 10 through 12, a description will be given of head arms 110c through 110e (head moving mechanisms 100c through 100e) that include through holes 122 and 124 arranged like a mesh. FIG. 10 is a schematic perspective view of a head moving mechanism 100d that includes the through holes 122 (or at least the barycenter of their distributed area) at an upper side (i.e., at a side of the head 140 or top 119) with respect to the area dividing line V. FIG. 11 is a schematic perspective view of a head moving mechanism 10e that includes the through hole 124 (or at least the barycenter of their distributed area) at its lower side (i.e., the driving shaft 150 or base 117 side) with respect to the area dividing line V.

Figure 32:
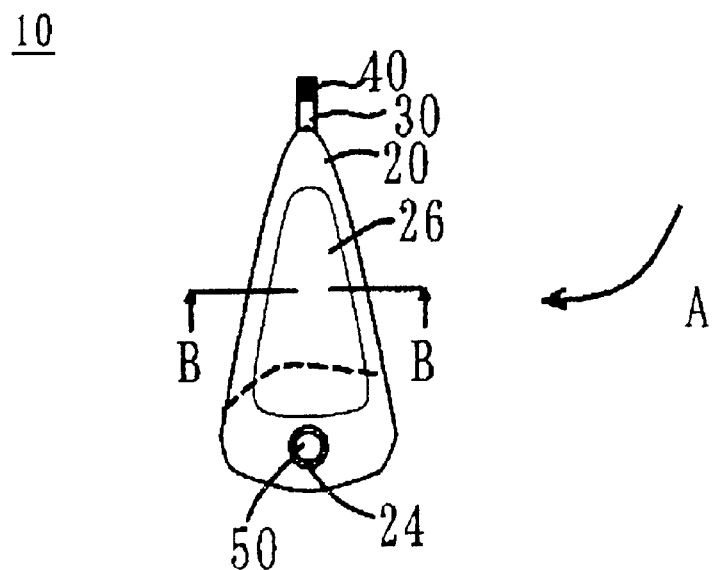
FIG. 32 is an exemplified schematic plan view of a conventional head moving mechanism.

The head moving mechanism 100c shown in FIG. 10 and the head moving mechanism 100d shown in FIG. 11 respectively achieve the same effect as the head moving mechanism 100a shown in FIG. 7 and the head moving mechanism 100b shown in FIG. 9. The through holes 122 and 124 may be formed by using a drill having a small diameter to bore holes having a small sectional opening area, or by joining a meshed metal plate to cover the opening of the through hole 120. The metal plate for the latter formation corresponds to the aforementioned sealing member, and a description thereof will thus be omitted. The meshed through holes 122 and 124 have reduced opening areas that reduce an area the airflow may pass, thereby reducing disturbance based upon the airflow. The through holes formed with a drill having a small diameter would particularly work effectively in this respect. Accordingly, a head moving mechanism 100e having meshed through holes 126 throughout its substantially entire surface of an area S as shown in FIG. 12 would sufficiently reduce disturbance by airflow compared with the head moving mechanism 10 shown in FIG. 32. FIG. 12 is a schematic perspective view of the head moving mechanism 100e that includes a mesh of through holes 126 throughout an approximately entire surface of the area S.

Figure 13:
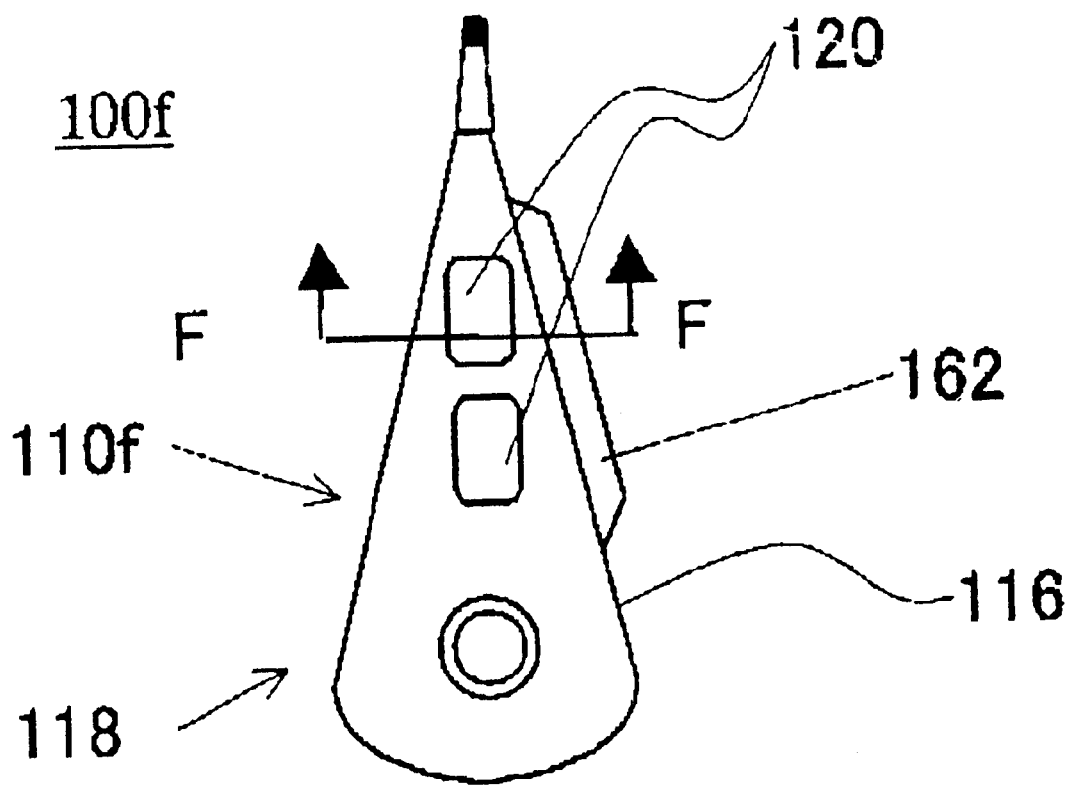
FIG. 13 is a schematic plan view of the head moving mechanism shown in FIG. 1 that includes a projection portion as a buffer mechanism at its right and/or left side.
Figure 14:
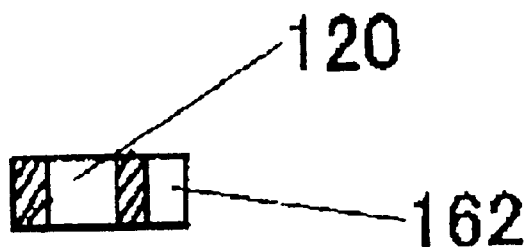
FIG. 14 is an exemplified sectional view taken along a line F—F shown in FIG. 13.
Figure 15:
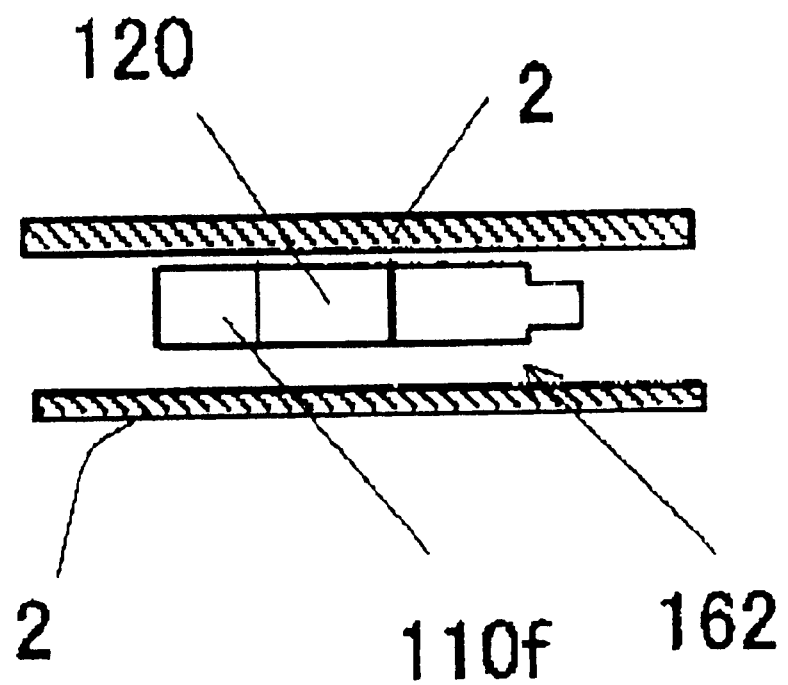
FIG. 15 is another exemplified sectional view taken along a line F—F shown in FIG. 13.
Figure 16:
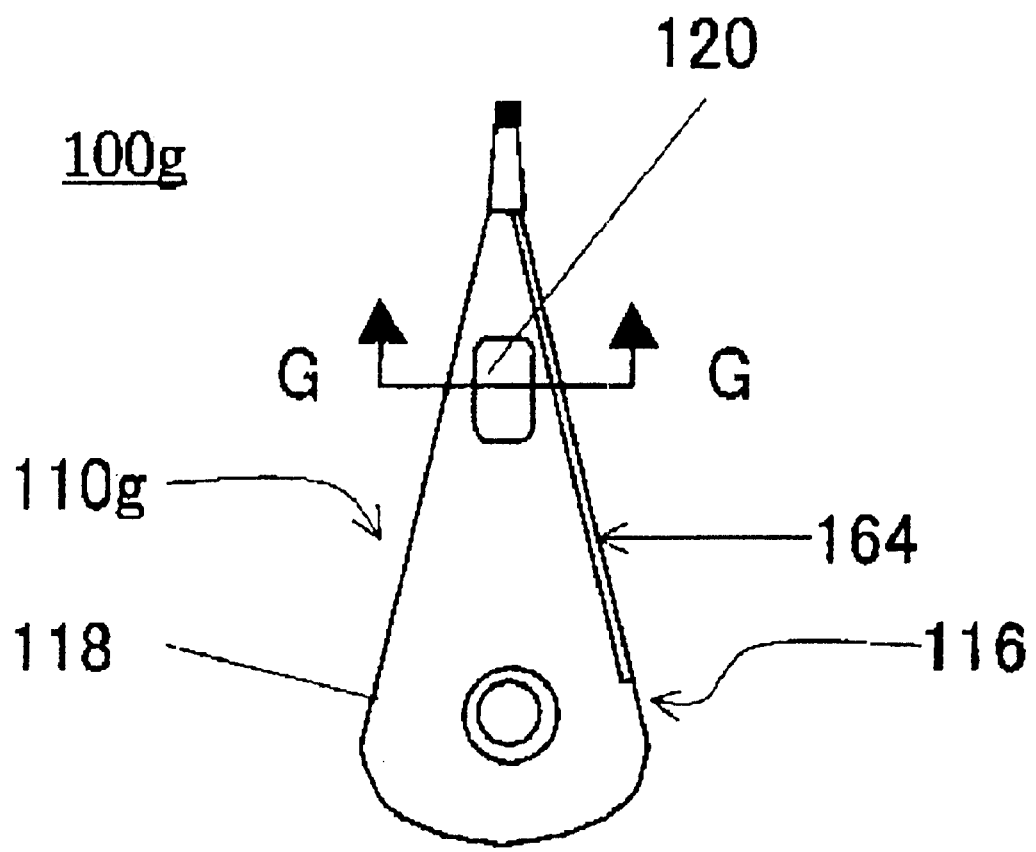
FIG. 16 is a schematic plan view of the head moving mechanism shown in FIG. 1 that includes a chamfered portion as a buffer mechanism at its right and/or left side.
Figure 17:
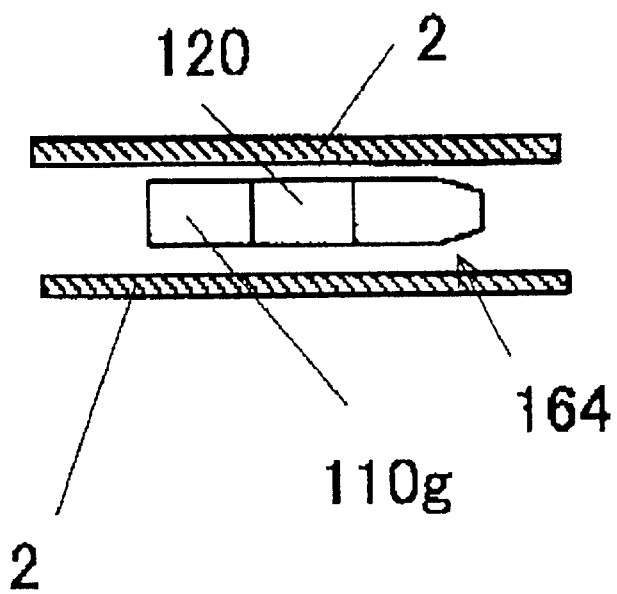
FIG. 17 is a sectional view taken along a line G—G shown in FIG. 16.
Figure 18:
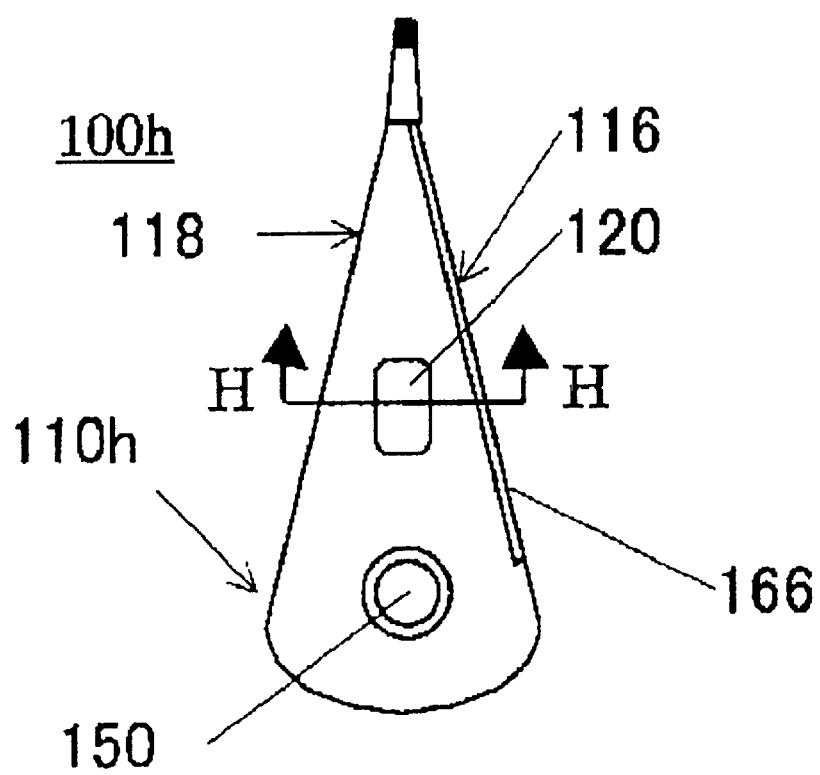
FIG. 18 is a schematic plan view of the head moving mechanism shown in FIG. 1 that includes a step (or cutaway portion) as a buffer mechanism at its right and/or left side.
Figure 19:
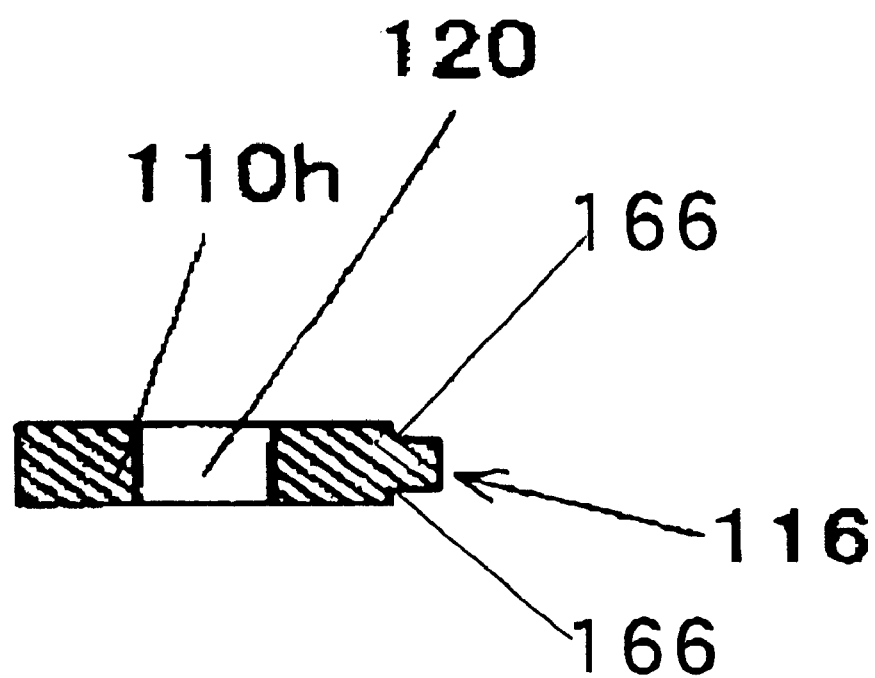
FIG. 19 is a sectional view taken along a line H—H shown in FIG. 18.
Figure 20:
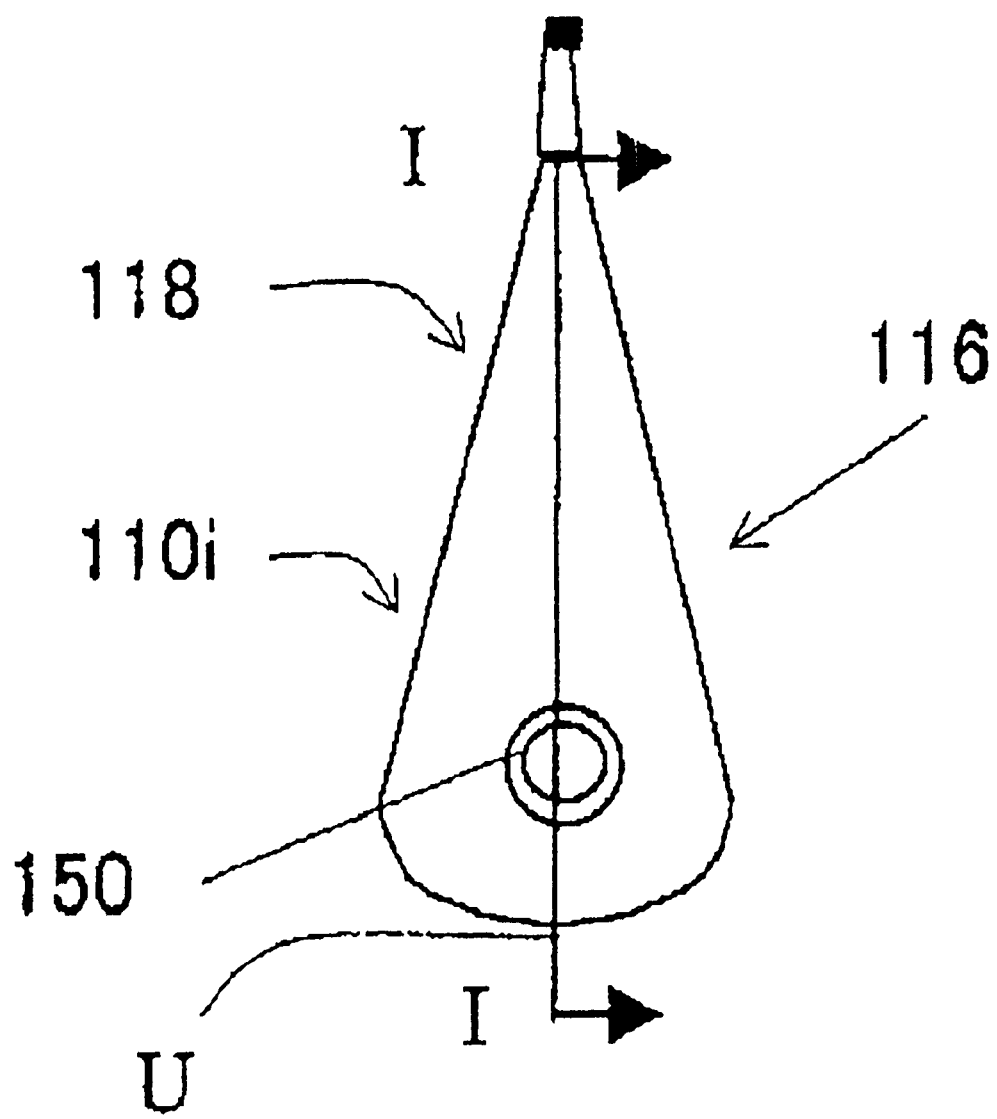
FIG. 20 is a schematic plan view of the head moving mechanism shown in FIG. 1 that includes a through hole as a buffer mechanism perforating its right and/or left side.
Figure 21:
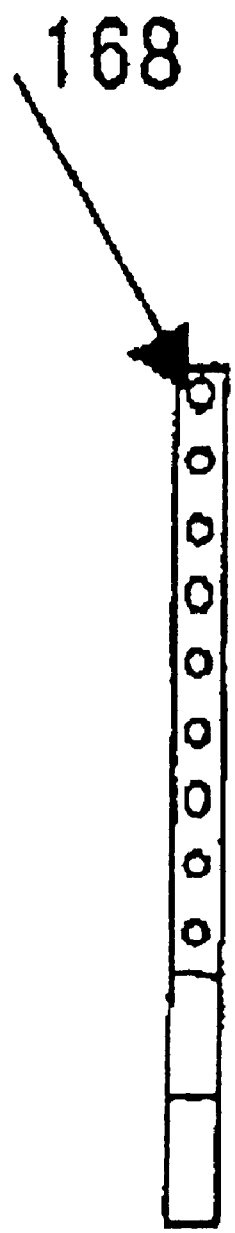
FIG. 21 is a sectional view taken along a line I—I shown in FIG. 20.

Referring now to FIGS. 13 through 20, a description will be given of head moving mechanisms 100f through 100i that includes a buffer mechanism at its right and/or left side. FIG. 13 is a schematic plan view of a head moving mechanism 100f that includes a buffer mechanism formed as a projection portion 162. FIG. 14 is an exemplified sectional view taken along a line F—F shown in FIG. 13, and FIG. 15 is another exemplified sectional view taken along the line F—F shown in FIG. 13. FIG. 16 is a schematic plan view of a head moving mechanism 100g that includes a buffer mechanism formed as a chamfered portion 164. FIG. 17 is a sectional view taken along a line G—G shown in FIG. 16. FIG. 18 is a schematic plan view of a head moving mechanism 100h that includes a buffer mechanism formed as a step (or cutaway portion) 166. FIG. 19 is a sectional view taken along a line H—H shown in FIG. 18. FIG. 20 is a schematic plan view of a head moving mechanism 100i that includes a buffer mechanism formed as through holes perforating its right side and left side surfaces 116, 118. FIG. 21 is a sectional view taken along a line I—I shown in FIG. 20.

The head moving mechanism 100f shown in FIG. 13 includes a head arm 110f. The head arm 110f includes the through hole(s) 20 in desired numbers, and the projection portion 162. The projection portion 162 may be formed level with the right side surface 116 as shown in FIG. 14, or as a convex in the middle of the right side surface 116 as shown in FIG. 15. The projection portion 162 in the latter form may be formed in the middle as shown in FIG. 15, or biased to the top or bottom surface on the right side surface 116. The structure of the projection portion 162 shown in FIG. 15 may allow the airflow to diffuse up and down about the head arm 110f, and would thus be preferable to that shown in FIG. 14. Although the projection portion 162 formed only at the left side surface 118 may also be effective to some extent in calming down the airflow, it is preferable to provide the projection portion 162 at the right side 116 as a windward side or at the both right side and left side surfaces 116, 118.

The head moving mechanism 100g shown in FIG. 16 includes the head arm 110g. The head arm 110g includes the through hole(s) 120 in desired numbers, and the chamfered portion 164. The chamfered portion 164 may be formed at both sides of the right side surface 116 as shown in FIG. 17, or only at one side thereof. However, the chamfered portion 164 may preferably be formed at both sides of the right side surface 116 as shown in FIG. 17 so that airflow may diffuse up and down about the head arm 110g. Although the chamfered portion 164 formed only at the left side surface 118 may also be effective to some extent in calming down the airflow, it is preferable to provide the chamfered portion 164 at the right side 116 as a windward side or at the both right side and left side surfaces 116, 118.

The head moving mechanism 100h shown in FIG. 18 includes the head arm 110h. The head arm 110h includes the through hole(s) 120 in desired numbers are provided, and the step (or cutaway portion) 166. The step 166 may be formed at both sides of the right side surface 116 as shown in FIG. 19, or only at one side thereof. However, the step 166 may preferably be formed at both sides of the right side surface 116 as shown in FIG. 19 so that airflow may diffuse up and down about the head arm 110h. Although the step 166 formed only at the left side surface 118 may also be effective to some extent in calming down the airflow, it is preferable to provide the step 166 at the right side 116 as a windward side or at the both right side and left side surfaces 116, 118.

The head moving mechanism 100i shown in FIG. 20 includes the head arm 110i. The head arm 110i includes through holes (air paths) 168 that perforate the right side and left side surfaces 116, 118 as shown in FIG. 21. The through holes 168 have an effect of reducing the air pressure applied to the right side surface 116 by allowing the airflow to pass through them. The through holes 168 may be provided in any number, size, and location.

These buffer mechanisms may be provided in arbitrary combination; for example, the projection portion 162 shown in FIG. 14 is provided with the chamfered portion 164.

The suspension 130 is made, for example, of aluminum, and may utilize any construction known in the art. The head 140 is a magnetic head in the present embodiment, but conceptually it broadly covers an optical head, a magneto-optical head, and other writing and/or reading head for a recordable medium.

Figure 22:
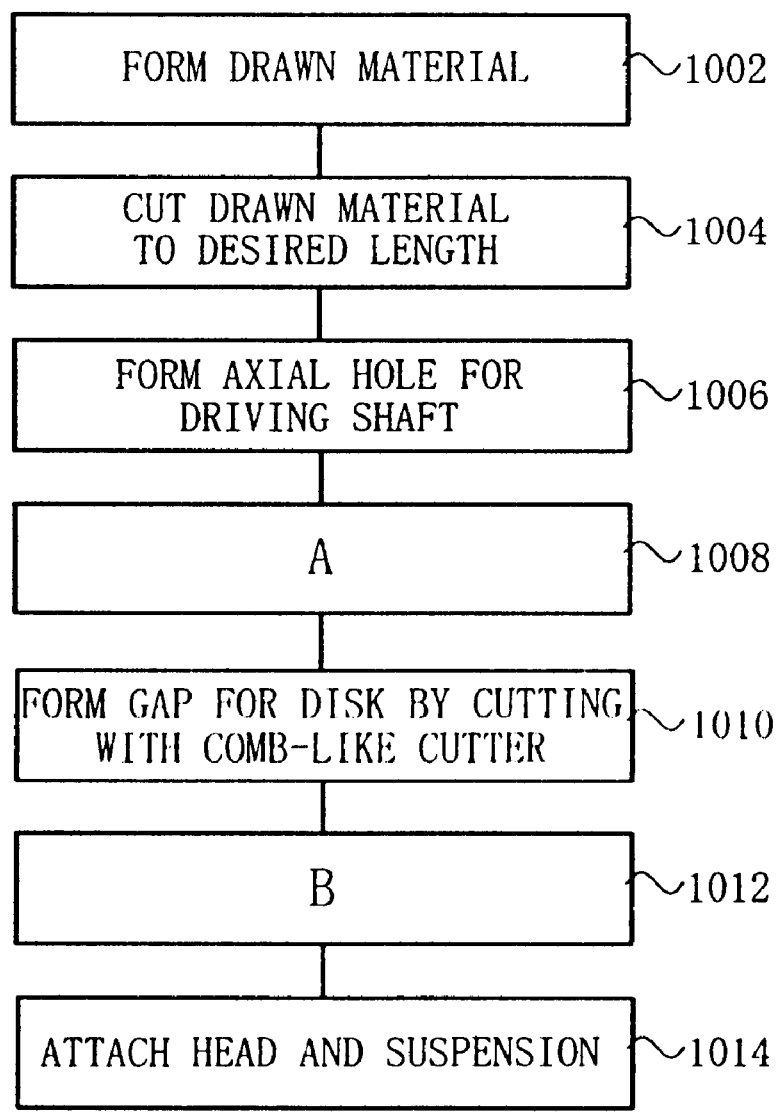
FIG. 22 is a flowchart of a method of manufacturing a head moving mechanism as one exemplified embodiment of the present invention.
Figure 23:
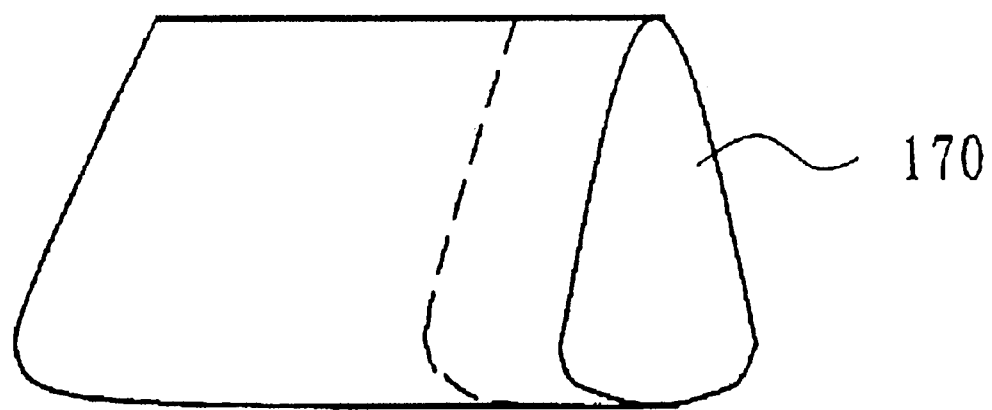
FIG. 23 is a schematic perspective view of a drawn material formed as a result of a step of forming a drawn material shown in FIG. 22.

Referring now to a flowchart shown in FIG. 22, a description will be given of a manufacturing method of the head moving mechanism 100 according to the present invention. First of all, aluminum or other materials is drawn using a die to form a bar of a drawn material having a cross section corresponding to the top surface 112 of the head moving mechanism 100 (step 1002). A specified length of mold may also be formed using an extrusion process in which the material is extruded rather than drawn from a die. FIG. 23 shows a schematic perspective view of the drawn material 170. Manufacturing of the head moving mechanism 100f may use a die incorporating the projection portion 162 (i.e., the head arm 110f has a cross section as shown in FIG. 14), or attach the projection portion 162 as a separate part afterward.

Figure 24:
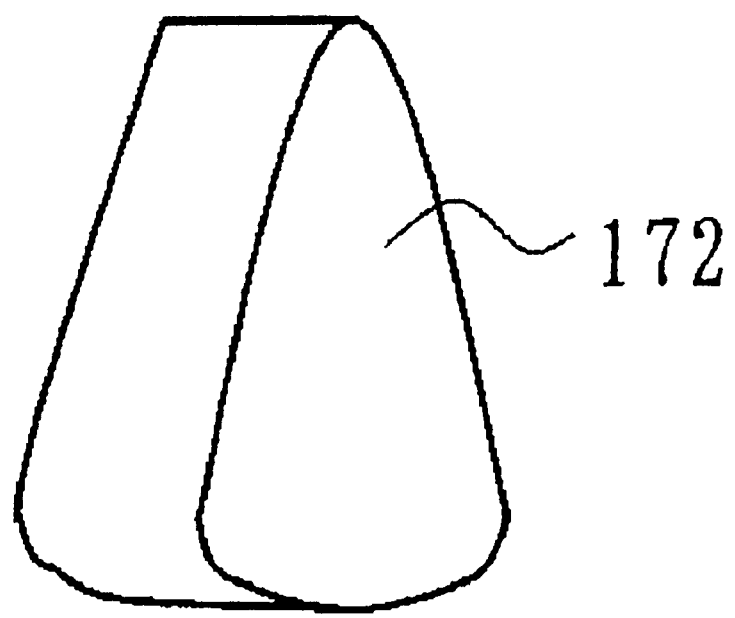
FIG. 24 is a schematic perspective view of a head arm base material formed as a result of a step of cutting a drawn material shown in FIG. 22.

Next, the drawn material 170 is cut to a desired length (step 1004). The desired length corresponds to a distance that allows a production of head arms in desired numbers. Thus a plurality of head arm base materials may, if required, be cut from the drawn material. FIG. 24 shows a schematic perspective view of the head arm base material 172 cut off at a dotted line shown in FIG. 23. Subsequently, an axial hole is formed in a connecting part of the base 117 to the driving shaft 150 (step 1006).

Figure 25:
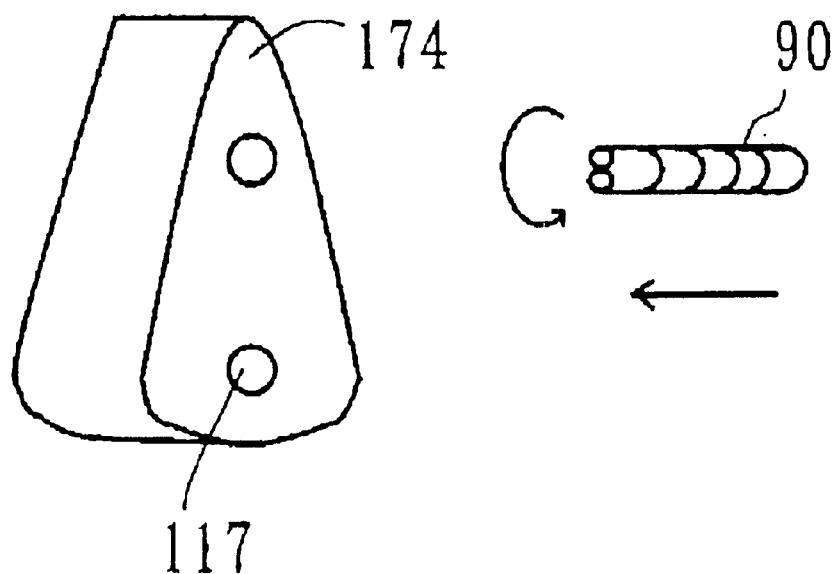
FIG. 25 is a schematic perspective view of a head arm base material including an axial hole and an optionally formed through hole formed as a result of a step of forming a driving-shaft hole shown in FIG. 22.

Next, the step 1008 may be added as an option A. Alternatively, the step 1006 may be followed directly by the step 1010. The option A includes the steps of forming the through holes 120, 122. 124 and/or 126, chamfered portion 164, step 166, air path 168, and/or the like. The through hole 120 may be formed, for example, using a drill or punch. The through holes 122 through 126 and 168 may be formed, for example, using a small drill having a small diameter. FIG. 25 shows a schematic perspective view of the head arm base material 172 in which the through hole 120 and the axial hole are formed using a drill 90. Arrows indicate moving and rotation directions of the drill 90.

Figure 26:
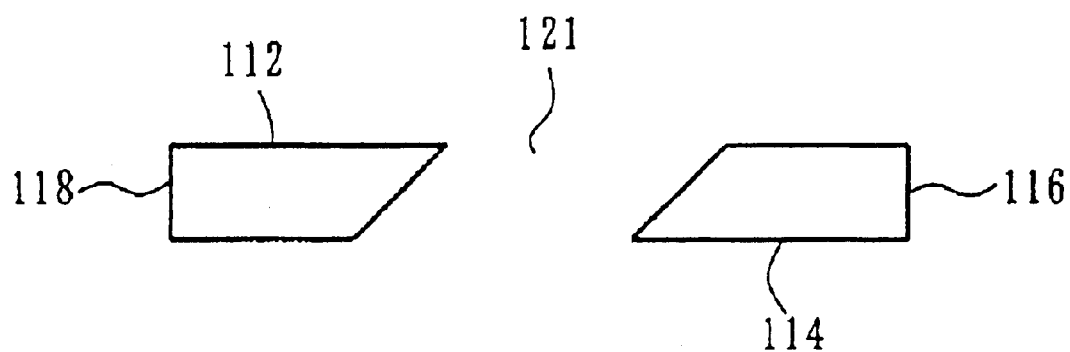
FIG. 26 is a schematic sectional view of the head arm shown in FIG. 1 that includes a slant through hole.

The through holes 120 through 126 may be perpendicular relative to the top and bottom surfaces 112, 114, preferably slant, and more preferably slant toward the windward side as shown in FIG. 26. FIG. 26 shows a schematic perspective view of the head arm shown in FIG. 1 that includes a slant through hole 121. The slant through hole 121 can more effectively reduce disturbance by airflow than a perpendicular through hole 120.

Figure 27:
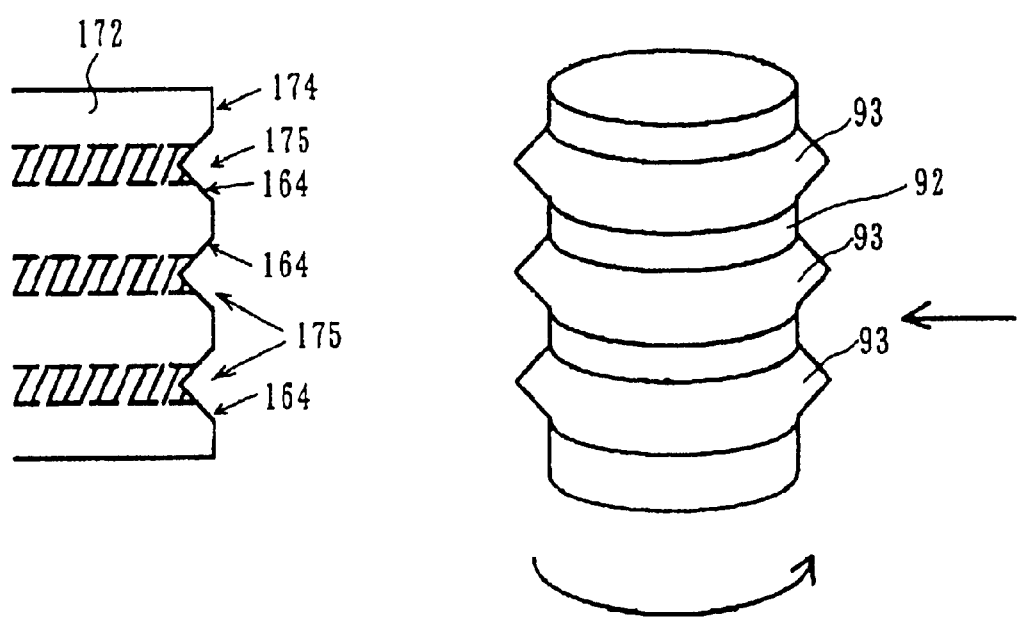
FIG. 27 is a schematic sectional view for explaining an exemplified method of forming the chamfered portion shown in FIG. 16.

The chamfered portion 164 and step 166 may be formed using a comb-like cutter, end mill, grinder, or the like used for step 1010. For example, as shown in FIG. 27, a tool 92 including a projection 93 having an approximately triangle cross section is moved and rotated in the arrow directions, and applied to the top 174 corresponding to the prospective top 119 to form indents 175. The center of each indent is aligned with the center of a hatched portion. Subsequently, the hatched portions defined with a dotted line shown in FIG. 27 are eliminated using a comb-like cutter (not shown), as will be described later with reference to FIG. 28, so that the chamfered portion 164 may be formed.

Figure 28:
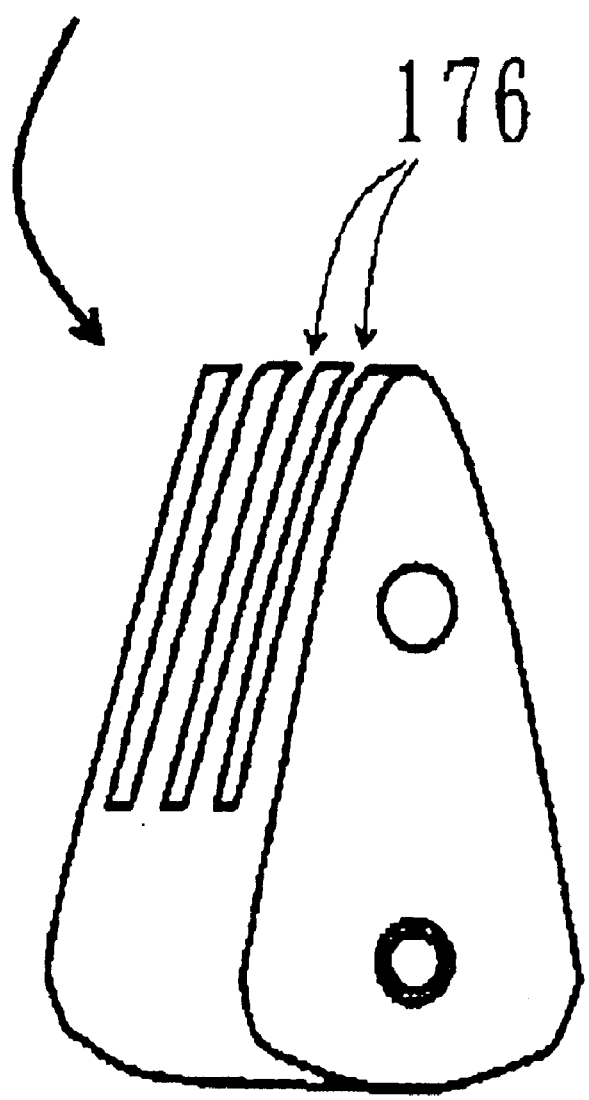
FIG. 28 is a schematic perspective view of a head arm base material that has passed a step of forming gaps for disks shown in FIG. 22.
Figure 29:
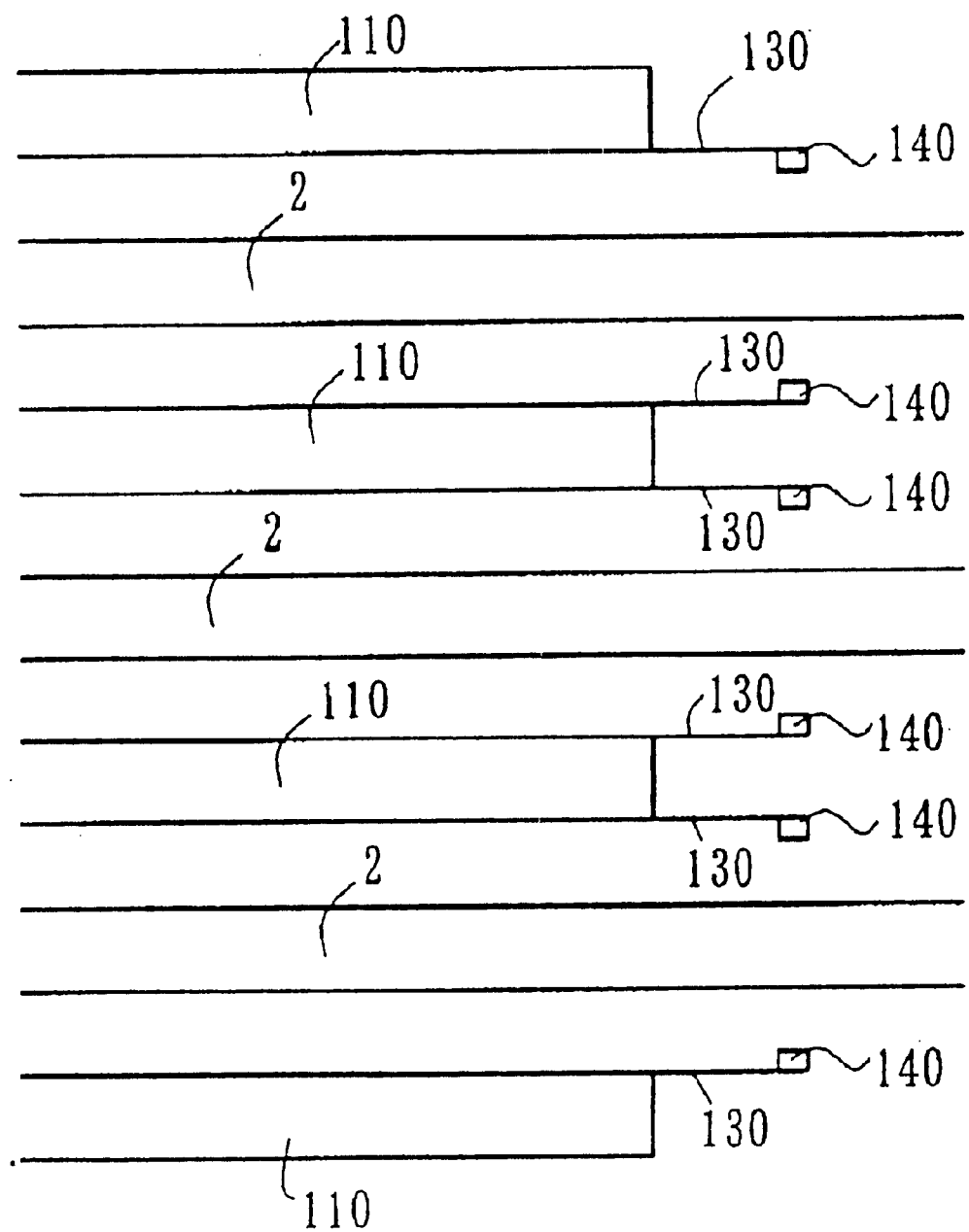
FIG. 29 is an exemplified partial and schematic section of a head moving mechanism in which heads and suspensions are attached to a head arm shown in FIG. 28 and inserted between disks.

Next, gaps for disks are formed using a comb-like cutter (not shown) (step 1010). Rotation of the comb-like cutter in an arrow direction shown in FIG. 28 may form gaps for disks 176. Each gap for a disk 176 corresponds to the hatched portion shown in FIG. 27, and FIGS. 27 and 28 show the three gaps for three disks, though the number of gaps is for illustrative purposes only. Each gap for a disk 176 may be set, for example, at 1 mm.

Next, the step 1012 may be added as an option B. Alternatively, the step 1010 may be followed directly by the step 1014. In option B, the sealing members 102, 104, and/or 106 are formed using tape (e.g., Kapton tape) or metal (e.g., aluminum or stainless steel). Lastly, heads and suspensions are attached, and the head moving mechanism is completed (step 1014). FIG. 9 shows the head moving mechanism in which heads 140 and suspensions 130 are attached to the head arm 110 and inserted between disks 2.

Figure 30:
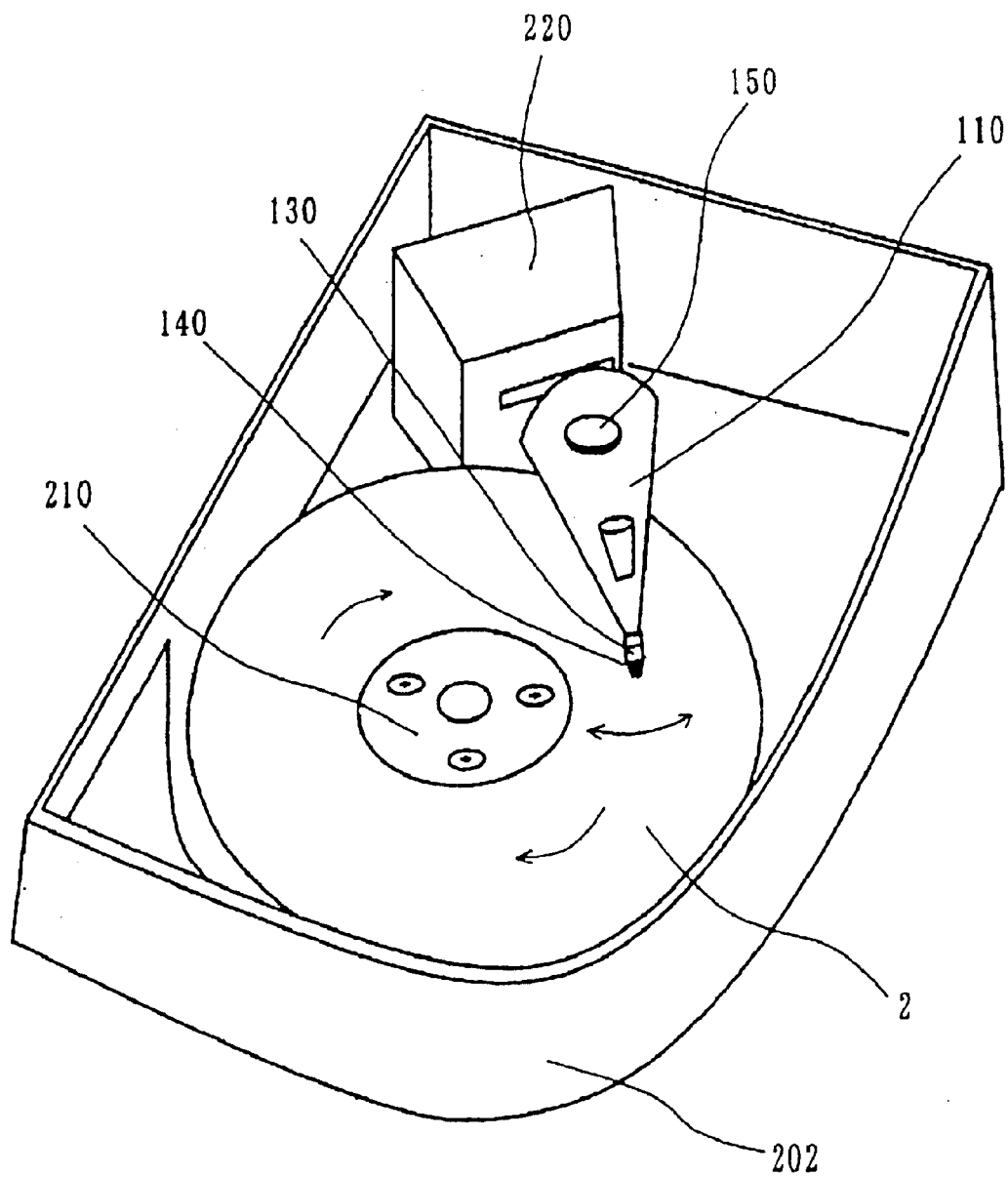
FIG. 30 is a schematic perspective view of a disk unit as one exemplified embodiment of the present invention.
Figure 31:
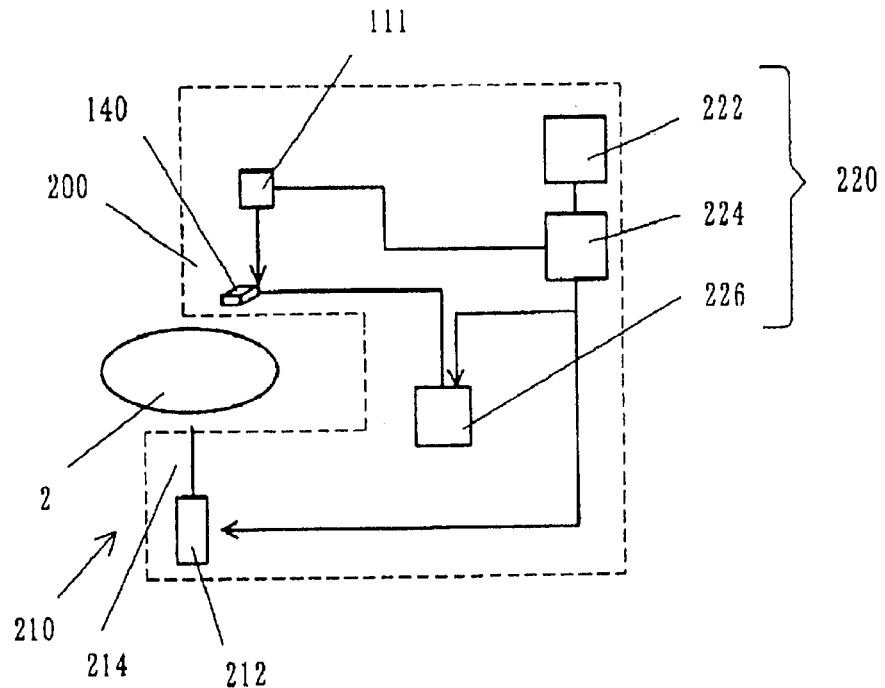
FIG. 31 is a block diagram for illustrating a control system of the disk unit shown in FIG. 30.

A description will now be given of a disk unit 200 including the inventive head moving mechanism 100 with reference to FIGS. 30 and 31. Hereupon, FIG. 30 is a schematic perspective view of the disk unit 200 as one exemplified embodiment of the present invention. FIG. 31 is a block diagram for illustrating a control system of the disk unit 200 shown in FIG. 30.

The disk unit 200 includes in its housing 202 a disk rotation means 210, a head arm 110, and a circuit part 220. The head arm 110 accommodates a coil 111 as shown in FIG. 31, and can swing about the driving shaft 150 when a current is fed through the coil 111. The disk rotation means 210 includes a spindle motor 212 shown in FIG. 31, and a disk rotation shaft 214 engageable with a motor shaft (not shown) and the disk 2.

The circuit part 220 includes a memory 212, a control circuit 224, and a signal processing circuit 226. The control circuit 224 controls operations of the head 140, the signal processing circuit 226, and the disk rotation means 210 under control of firmware stored in the memory 212. The control circuit 224 controls movements of the head 140 by controlling a current fed through the coil 111. The head 140 reads data on the disk 2, and transmits it to the signal processing circuit 226. The signal processing circuit 226 is connected to an interface (e.g., SCSI interface) to an external device (not shown), and can demodulate the data into original information and transmit it to the external device. The signal processing circuit 226 also receives information to be recorded onto the disk from the external device, and writes it onto the disk 2 through the head 140.

In operation, the control circuit 224 controls the current fed through the coil 111, and thereby leads the head 140 to access a desired track on the disk 2. In that event, the head 140 can quickly position to the destination track, while the aforementioned sealing member (120, etc.) and/or buffer mechanism (162, etc.) reduce or eliminate the effect of disturbance (vibration, etc.) by airflow. The head 140 then reads information on the destination track and transmits it to the signal processing circuit 226, or writes onto the destination track information received from the signal processing circuit 226.

Although various preferred embodiments of the present invention have been described above, the present invention is not limited to these preferred embodiments, but various variations and modifications may be made without departing from the spirit and scope of the present invention.

The head arm as one exemplified embodiment of the present invention does not allow airflow to pass through it, and may thus be unlikely to undergo disturbance such as a vibration by the airflow. Consequently, the head arm can quickly position the head. The head arm as another exemplified embodiment of the present invention includes a through hole, and thus becomes lightweight, while disturbance by airflow is localized and reduced by limiting a location of the through hole. In particular, the head arm provided with a plurality of the through holes might most enjoy the effect of reduced disturbance. As a result, the head arm can quickly position the head. The head arm as still another exemplified embodiment of the present invention includes the through hole formed like a mesh, and may thus reduce the magnitude of airflow that may pass through it. Resultantly, the head arm can quickly position the head. The head arm as still another exemplified embodiment of the present invention includes a buffer mechanism for reducing disturbance by airflow. Accordingly, the head arm can quickly position the head.

The head moving mechanism, disk unit, and method of manufacturing the head arm as one exemplified embodiment of the present invention have the same effect as the above head arm, and therefore allow the head to quickly be positioned.

What is claimed is:

1. A head arm comprising:
    a main body, partially located above a recordable medium, wherein said main body includes a buffer mechanism for mitigating disturbance of the airflow, the buffer mechanism being connected to at least one of a third surface opposite to airflow generated above a recordable medium and a fourth surface opposite to said third surface;
    said main body having a first connector portion connectible to a driving portion; and a second connector portion connectible to a head,
    wherein said buffer mechanism includes a through hole that perforates said third and fourth surfaces.

2. A head arm according to claim 1, wherein said through hole is slanted relative to a cross section perpendicular to said first and second surfaces.

3. A head moving mechanism comprising:
    a head arm including,
        a main body, partially located with a first area above a recordable medium, said main body including a first surface opposite to said recordable medium and a second surface opposite to said first surface, said first and second surfaces having one or more through holes passing between the first and second said surfaces;
        said main body having a first connector portion connected to said main body, and connectible to a driving portion; and a second connectible to a head,
        wherein all said one or more through holes are formed on only one side with respect to a line that halves said first area between said first and second connector portions; and
    a head connected to said second connector portion of said head arm.

4. A disk unit comprising:
    a head arm including,
        a main body, partially located with a first area above a recordable medium, said main body including a first surface opposite to said recordable medium and a second surface opposite to said first surface, said first and second surfaces having one or more through holes passing between the first and second said surfaces;
        said main body having a first connector portion connected to said main body, and connectible to a driving portion; and a second connectible to a head,
        wherein all said one or more through holes are formed on only one side with respect to a line that halves said first area between said first and second connector portions;
    wherein said recordable medium is a disk;
    a head connected to said second connector portion of said head arm;
    a driving portion connected to said first connector portion of said head arm;
    a signal processor portion that handles a signal communicated between said head and said disk;
    a rotor portion that rotates said disk; and
    a controller portion that controls movements of said head, operations of said signal processor portion and said rotor portion.

5. A head arm comprising:
    a main body, partially located with a first area above a recordable medium, said main body including a first surface opposite to said recordable medium and a second surface opposite to said first surface, said first and second surfaces having one or more through holes passing between said first and second surfaces;
    said main body having a first connector portion connected to said main body, and connectible to a driving portion; and a second connector portion connectible to a head,
    wherein all of said one or more through holes are formed on only one side with respect to a line that halves said first area between said first and second connector portions.

6. A head arm according to claim 5, wherein said through hole is formed on a side closer to said head with respect to said line that halves said first area.

7. A head arm according to claim 5, wherein said through hole is formed on a side closer to said driving portion with respect to said line that halves said first area.

8. A head arm according to claim 5, wherein said driving portion swings said head arm about a specified rotation shaft, said line that halves said first area being a tangent to a circle whose center is said rotation shaft.

9. A head arm comprising:

a main body, partially located above a recordable medium, said main body including a first surface opposite to said recordable medium and a second surface opposite to said first surface, said first and second surfaces having a plurality of through holes passing between said first and second surfaces and formed like a mesh;

a first connector portion connected to said main body, and connectible to a driving portion; and a second connector portion connected to said main body, and connectible to a head.

10. A head arm according to claim 9, wherein said through holes are arranged on an entire surface of said main body that is located above said recordable medium.

11. A head arm comprising:

a main body, partially located above a recordable medium, which includes a first surface opposite to said recordable medium and a second surface opposite to said first surface, said first and second surfaces having one or more through holes passing between said first and second surfaces, wherein said main body includes a buffer mechanism, connected to at least one of a third surface opposite to an airflow generated above said recordable medium and a fourth surface opposite to said third surface for mitigating disturbance of the airflow;

said main body having a first connector portion connectible to a driving portion; and a second connector portion connectible to a head, wherein said buffer mechanism includes a step formed on at least one of said third and fourth surfaces, and all of said through holes are formed on only one side with respect to a line that halves said main body are between said first and second connector portions.

12. A head arm comprising:

a main body, partially located above a recordable medium, which includes a first surface opposite to said recordable medium and a second surface opposite to said first surface, said first and second surfaces having one or more through holes passing between said first and second surfaces, wherein said main body includes a buffer mechanism, connected to at least one of a third surface opposite to an airflow generated above said recordable medium and a fourth surface opposite to said third surface for mitigating disturbance of the airflow;

said main body having a first connector portion connectible to a driving portion; and a second connector portion connectible to a head;

wherein said buffer mechanism includes a chamfered portion formed on at least one of said third and fourth surfaces, and all of said through holes are formed on only one side with respect to a line that halves said main body between said first and second connector portions.

* * * * *